US007321733B2

(12) United States Patent
Ikushima et al.

(10) Patent No.: US 7,321,733 B2
(45) Date of Patent: Jan. 22, 2008

(54) SPLIT-BAND OPTICAL TRANSMISSION SYSTEM AND OPTICAL TRANSMISSION METHOD USED THEREIN

(75) Inventors: Tsuyoshi Ikushima, Yamatotakada (JP); Masaru Fuse, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 520 days.

(21) Appl. No.: 10/515,228

(22) PCT Filed: Jun. 4, 2004

(86) PCT No.: PCT/JP2004/008143
§ 371 (c)(1),
(2), (4) Date: Nov. 22, 2004

(87) PCT Pub. No.: WO2004/112293
PCT Pub. Date: Dec. 23, 2004

(65) Prior Publication Data
US 2005/0213977 A1    Sep. 29, 2005

(30) Foreign Application Priority Data
Jun. 13, 2003   (JP) ............................... 2003-169068

(51) Int. Cl.
*H04B 10/12* (2006.01)
(52) U.S. Cl. .................. 398/141; 398/79; 398/182; 398/183; 398/192; 398/194; 398/200; 398/201; 398/202; 398/208; 398/209; 398/214; 398/91; 398/94; 398/93; 398/33; 398/34; 398/158; 398/159; 398/147; 398/162; 398/76; 398/82
(58) Field of Classification Search .................. 398/79, 398/76, 82, 34, 91, 33, 93, 27, 94, 162, 95, 398/141, 182, 158, 202, 159, 183, 186, 187, 398/192, 195, 196, 197, 198, 208, 209, 213, 398/214, 140, 147, 156, 194, 200, 201
See application file for complete search history.

(56) References Cited

U.S. PATENT DOCUMENTS
5,896,211 A * 4/1999 Watanabe ................. 398/76
6,078,412 A   6/2000 Fuse et al.

FOREIGN PATENT DOCUMENTS
| JP | 06-112907   | 4/1994 |
| JP | 2760233     | 3/1998 |
| JP | 11-205240   | 7/1999 |
| JP | 2001-94491  | 4/2001 |
| WO | 00/42727    | 7/2000 |

OTHER PUBLICATIONS
P.D. Sargis et al: "Subcarrier multiplexing with dispersion reduction" Electronics Letters, IEE Stevenage, GB, vol. 31, No. 20. Sep. 28, 1995. pp. 1769-1770.

* cited by examiner

*Primary Examiner*—Hanh Phan
(74) *Attorney, Agent, or Firm*—Wenderoth, Lind & Ponack, L.L.P.

(57) ABSTRACT

An optical transmission system including an optical transmitting device and an optical receiving device. The optical transmitting device includes a data signal splitting section for splitting data signal information into at least two parts and generating at least two electrical signals having different center frequencies and bands, a frequency multiplexing section for performing frequency multiplexing for the at least two electrical signals, and an electrical-to-optical conversion section for converting the frequency-multiplexed signal to an optical signal and sending it to an optical transmission path. The optical receiving device includes an optical-to-electrical conversion section for converting the optical signal to a frequency-multiplexed signal, a band demultiplexing section for demultiplexing the frequency-multiplexed signal to obtain at least two electrical signals, and a data signal recovering section for recovering the data signal based on the at least two demultiplexed electrical signals.

24 Claims, 18 Drawing Sheets

F I G. 1 7 A
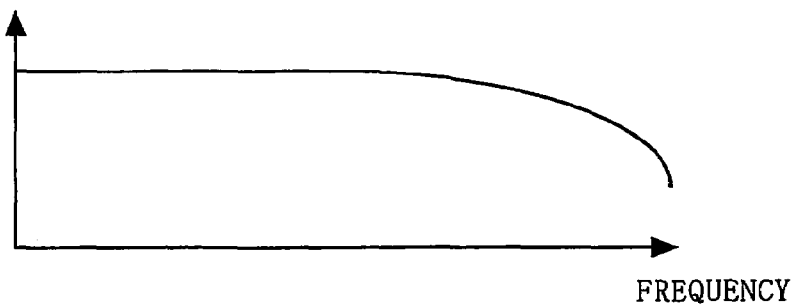
FREQUENCY
F I G. 1 7 B
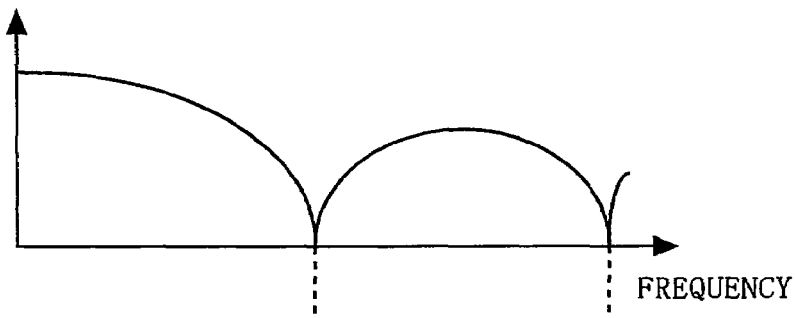
FREQUENCY
F I G. 1 7 C
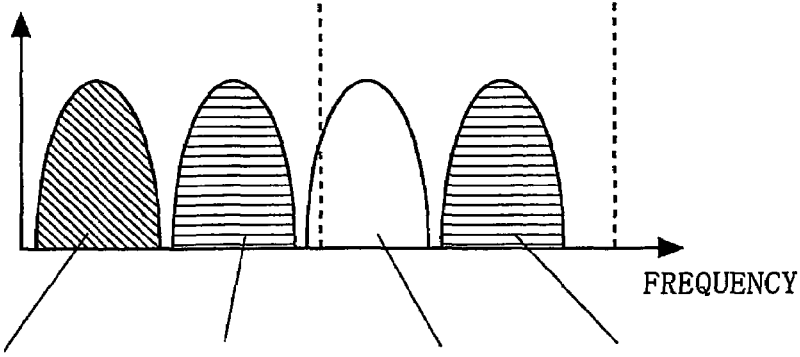
FREQUENCY
MODULATION SIGNAL OF MODULATION SECTION 191 QUATERNARY
MODULATION SIGNAL OF MODULATION SECTION 192 BINARY
MODULATION SECTION 193 MODULATION IS NOT PERFORMED
MODULATION SIGNAL OF MODULATION SECTION 194 BINARY

SPLIT-BAND OPTICAL TRANSMISSION SYSTEM AND OPTICAL TRANSMISSION METHOD USED THEREIN

BACKGROUND OF THE INVENTION

1. Field of the Invention

The present invention relates to an optical transmission system, and an optical transmitting device, an optical receiving device, and an optical transmission method used therein. More particularly, the present invention relates to a split-band optical transmission system, by which a frequency band is split, electrical signals are multiplexed, conversion to an optical signal is performed, and the resultant signal is transmitted, and an optical transmitting device, an optical receiving device, and an optical transmission method used therein.

2. Description of the Related Art

In recent years, the proliferation of broadband access increases the demand for a high-capacity transmission in a metropolitan area network and an access network. In response to such a demand, a high-speed optical transmission and a wavelength multiplexing optical transmission, which are mainly used in a backbone network, are being introduced into the metropolitan area network and the access network. The transmission speed of such a high-speed transmission exceeds 10 Gbps. However, compared to the backbone network, the metropolitan area network and the access network place a higher priority on cost-reduction, and require a configuration in which a high-speed transmission is realized at low cost.

When a high-speed optical transmission whose transmission speed exceeds 10 Gbps is performed, chromatic dispersion causes severe transmission waveform distortion. For example, in the case where an electrical signal is converted to an optical signal in the 1.55 μm range by using an optical transmitter, the optical signal is transmitted over a dispersion optical fiber, and the transmitted optical signal is converted to an electrical signal by using an optical receiver, the distortion of a transmission waveform becomes more pronounced. FIG. 19A is an illustration showing a frequency response of a conventional optical transmitter. FIG. 19B is an illustration showing a frequency response of a conventional optical transmission path composed of an optical transmitter, an optical receiver, and an optical fiber. FIG. 19C is an illustration showing a signal band used in conventional baseband transmission. In FIGS. 19A to 19C, a horizontal axis represents a frequency of an electrical signal input to the optical transmitter, and a vertical axis represents the level of the electrical signal. As shown in FIG. 19A, the optical transmitter has a frequency response whose band is wider than the signal band as shown in FIG. 19C. However, in the case where an optical signal in the 1.55 μm range is transmitted over the dispersion optical fiber, in general, it is impossible to transmit a signal in the vicinity of a frequency $f_{m1}$ and a frequency $f_{m2}$, as shown in FIG. 19B, due to chromatic dispersion. As such, as a transmission range becomes longer, a band reserved for an optical signal becomes narrower than the signal band. Thus, an optical signal can only be transmitted over a range in which a band of the optical transmission path is wider than a signal band. As a result, in the conventional configuration, it is difficult to perform a long-range transmission.

Thus, many methods enabling a long-range transmission by compensating chromatic dispersion have been developed. FIG. 20 is an illustration showing one example of an optical communication device utilizing a conventional chromatic dispersion compensation method disclosed in Japanese Patent Gazette No. 2760233. This method utilizes a dispersion compensation fiber whose chromatic dispersion is the inverse of chromatic dispersion of an optical fiber used in an optical transmission path. This optical communication device includes a transmitter 71, a dispersion compensation fibers 72 and 74, an optical transmission path 73, and a receiver 75. The dispersion compensation fibers 72 and 74 are set to have chromatic dispersion characteristics by which chromatic dispersion of the optical transmission path 73 is cancelled.

Other than the example as shown in FIG. 20, various types of dispersion compensation methods (e.g., a method in which a dispersion compensation fiber is replaced with a fiber grating) have been developed. These dispersion compensation methods are characterized in that an optical device whose chromatic dispersion is the inverse of chromatic dispersion of an optical transmission path is used for canceling chromatic dispersion of the optical transmission path.

However, in general, an optical device such as a dispersion compensation fiber used for chromatic dispersion is expensive, and it is difficult to apply such an optical device to the metropolitan area network and the access network.

DESCRIPTION OF THE INVENTION

Therefore, an object of the present invention is to provide a split-band optical transmission system by which high-speed, long-range, and high-quality transmission of an optical signal can be realized by an optical transmission path affected by chromatic dispersion without using an expensive chromatic dispersion compensation optical device, and an optical transmitting device, an optical receiving device, and an optical transmission method used therein.

To achieve the above objects, the present invention has the following aspects.

A first aspect of the present invention is directed to an optical transmission system including an optical transmitting device for converting an inputted data signal to an optical signal and sending the optical signal to an optical transmission path, and an optical receiving device for receiving the optical signal transmitted via the optical transmission path and converting the received optical signal to the data signal. The optical transmitting device includes a data signal splitting section for splitting information included in the data signal into at least two pieces of information, and generating at least two electrical signals having different center frequencies and bands. Further, the optical transmitting device includes a frequency multiplexing section for performing frequency multiplexing for the at least two electrical signals generated by the data signal splitting section, and an electrical-to-optical conversion section for converting the frequency-multiplexed signal generated by the frequency multiplexing section to an optical signal and sending the optical signal to the optical transmission path.

The optical receiving device includes an optical-to-electrical conversion section for converting the optical signal transmitted via the optical transmission path to the frequency-multiplexed signal, a band demultiplexing section for demultiplexing the frequency-multiplexed signal output from the optical-to-electrical conversion section to obtain the at least two electrical signals, and a data signal recovering section for recovering the data signal based on the at least two electrical signals demultiplexed by the band demultiplexing section.

The data signal splitting section generates the at least two electrical signals so that the electrical signals are located in different frequency bands away from a local minimum in a frequency response of the optical transmission path.

Based on the first aspect of the present invention, even if there is a frequency at which a frequency response is severely distorted due to chromatic dispersion, etc., in a band corresponding to a transmission rate, a band of a signal is located so as to avoid such a frequency. Thus, it is possible to perform high-quality, high-speed, and long-range transmission of an optical signal from the optical transmitting device to the optical receiving device without using a chromatic dispersion compensation optical device.

Preferably, the data signal splitting section may include a signal splitting section for splitting information included in the data signal into two pieces of information in accordance with a predetermined split ratio corresponding to a frequency response of the optical transmission path, and for outputting the resultant two pieces of information as first and second baseband signals, and may include a band up conversion section for converting the second baseband signal output from the signal splitting section to a passband signal having a predetermined frequency as a center frequency. Further, the data signal splitting section may output the first baseband signal and the passband signal as the electrical signals.

The frequency multiplexing section may perform frequency multiplexing for the first baseband signal and the passband signal.

The band demultiplexing section may demultiplex the frequency-multiplexed signal to obtain the first baseband signal and the passband signal.

The data signal recovering section may include a band down conversion section for converting the passband signal demultiplexed by the band demultiplexing section to the second baseband signal by frequency conversion, and a signal multiplexing section for recovering the data signal by multiplexing the first baseband signal demultiplexed by the band demultiplexing section and the second baseband signal converted by the band down conversion section.

Preferably, the optical transmission path may at least have a frequency response having first and second frequencies as local minimums. The predetermined split ratio may be determined based on a ratio between a bandwidth of a base band up to the first frequency and a bandwidth of a passband from the first frequency to the second frequency. The predetermined frequency may lie within the passband.

As a result, even if there are at least two frequencies at which a frequency response is severely distorted due to chromatic dispersion, etc., it is possible to perform high-quality, high-speed, and long-range transmission of an optical signal from the optical transmitting device to the optical receiving device without using a chromatic dispersion compensation optical device.

For example, the band up conversion section may include a sine wave oscillator for generating a sine wave signal with the predetermined frequency, a mixer for performing frequency conversion for the second baseband signal, by mixing the second baseband signal and the sine wave signal output from the sine wave oscillator, to obtain the passband signal whose center frequency is equal to the frequency of the sine wave signal, and a band-pass filter for extracting only the passband signal from a signal output from the mixer.

For example, the band demultiplexing section may be composed of a low-pass filter for demultiplexing the second baseband signal, and a high-pass filter for demultiplexing the passband signal.

Further, for example, the band down conversion section may include a sine wave oscillator for outputting a sine wave signal with the predetermined frequency, a mixer for converting the passband signal to a baseband by frequency conversion by mixing the passband signal with the sine wave signal, and a low-pass filter for extracting only the second baseband signal from a signal output from the mixer.

Preferably, the optical receiving device may further include, a first error detecting section for detecting an error rate of the first baseband signal demultiplexed by the band demultiplexing section a second error detecting section for detecting an error rate of the second baseband signal output from the band down conversion section. Further, the optical receiving device may include a band control section for controlling the predetermined split ratio in the signal splitting section and the predetermined frequency in the band up conversion section so that the error rates of the first and second baseband signals are smaller than a predetermined value.

As a result, it is possible to optimally set a band to be used by monitoring an error rate of the baseband signal. Thus, it is possible to provide an optical transmission system which can be applied to a transmission path having various frequency responses, that is, an optical transmission system capable of handling various transmission ranges and various wavelengths of a laser with one type of system configuration.

Preferably, the optical transmitting device may further include a monitor signal source for outputting a monitor signal, which is a sine wave signal, while sweeping a frequency thereof, include and a switch for inputting, to the electrical-to-optical conversion section, either a frequency-multiplexed signal output from the frequency multiplexing section or a monitor signal output from the monitor signal source.

The optical receiving device may further include a frequency response detecting section for extracting the monitor signal from a signal output from the optical-to-electrical conversion section and for detecting a frequency response of the optical transmission path based on a level of the swept monitor signal. Further, the optical receiving device may include a band control section for controlling the predetermined split ratio in the signal splitting section and the predetermined frequency in the band up conversion section based on the frequency response of the optical transmission path detected by the frequency response detecting section.

As a result, it is possible to detect a frequency response of a transmission path, and set a frequency location of a signal based thereon. Thus, it is possible to provide an optical transmission system which can be applied to a transmission path having various frequency responses, that is, an optical transmission system capable of handling various transmission ranges and various wavelengths of a laser with one type of system configuration.

Preferably, the data signal splitting section may include a signal splitting section for splitting information included in the data signal into two pieces of information in accordance with a predetermined split ratio corresponding to a frequency response of the optical transmission path and for outputting the resultant two pieces of information as first and second baseband signals. Further, the data signal splitting section may include a first multilevel modulation section for performing multilevel modulation for the first baseband signal output from the signal splitting section in accordance with a predetermined first M-ary number determined based on a frequency response of the optical transmission path and for outputting a first multilevel modulation signal. In addition, the data signal splitting section may include a second multilevel modulation section for performing multilevel modulation for the second baseband signal output from the signal splitting section in accordance with a predetermined second M-ary number determined based on a frequency response of the optical transmission path and for outputting a second multilevel modulation signal, and may include a band up conversion section for converting the second multilevel modulation signal output from the second multilevel modulation section to a passband signal having a predetermined frequency as a center frequency. The data signal splitting section may output the first multilevel modulation signal and the passband signal as the electrical signals.

The frequency multiplexing section may perform frequency multiplexing for the first multilevel modulation signal and the passband signal.

The band demultiplexing section may demultiplex the frequency-multiplexed signal to obtain the first multilevel modulation signal and the passband signal.

The data signal recovering section may include a first multilevel demodulation section for demodulating the first multilevel modulation signal demultiplexed by the band demultiplexing section and for outputting the first baseband signal. Further, the data signal recovering section may include a band down conversion section for performing frequency conversion for the passband signal demultiplexed by the band demultiplexing section and for outputting the second multilevel modulation signal. In addition, the data signal recovering section may include a second multilevel demodulation section for converting the second multilevel modulation signal output from the band down conversion section to the second baseband signal by demodulation, and may include a signal multiplexing section for recovering the data signal by multiplexing the first baseband signal output from the first multilevel demodulation section and the second baseband signal output from the second multilevel demodulation section.

As a result, it is possible to transmit the same amount of information over a narrower frequency band. Thus, it is possible to provide an optical transmission system capable of transmitting a data signal even if a high frequency band is not available for transmission due to severe distortion of a frequency response of an optical transmission path.

Preferably, the predetermined first and second M-ary numbers are determined based on data rates necessary for the first and second baseband signals and a ratio of frequency bands assigned to the first and second baseband signals.

As a result, it is possible to handle a case in which a frequency response of a transmission path is severely distorted.

Preferably, the optical receiving device may further include a first error detecting section for detecting an error rate of the first baseband signal output from the first multilevel demodulation section. Further, the optical receiving device may include a second error rate detecting section for detecting an error rate of the second baseband signal output from the second multilevel demodulation section. In addition, the optical receiving device may include a band M-ary number control section for controlling the predetermined split ratio in the signal splitting section, the predetermined frequency in the band up conversion section, the predetermined first M-ary number in the first multilevel modulation section, and the predetermined second M-ary number in the second multilevel modulation section so that the error rates of the first and second baseband signals are smaller than a predetermined value.

As a result, it is possible to optimally set a band to be used by monitoring an error rate of the baseband signal. Thus, it is possible to provide an optical transmission system which can be applied to a transmission path having various frequency responses, that is, an optical transmission system capable of handling various transmission ranges and various wavelengths of a laser with one type of system configuration.

For example, the passband signal may be a signal for which single side-band modulation is performed.

As a result, it is possible to perform transmission over a narrower frequency band, making it is possible to handle a case in which a frequency response of a transmission path is severely distorted.

Preferably, the data signal splitting section may include a signal splitting section for splitting information included in the data signal into two pieces of information in accordance with a predetermined split ratio corresponding to a frequency response of the optical transmission path and for outputting the resultant two pieces of information as first and second baseband signals. Further, the data signal splitting section may include a first duo-binary modulation section for performing duo-binary modulation for the first baseband signal output from the signal splitting section and for outputting a first duo-binary signal. In addition, the data signal splitting section may include a second duo-binary modulation section for performing duo-binary modulation for the second baseband signal output from the signal splitting section and for outputting a second duo-binary signal, and may include a band up conversion section for converting the second duo-binary signal output from the second duo-binary modulation section to a passband signal having a predetermined frequency as a center frequency. The data signal splitting section may output the first duo-binary signal and the passband signal as the electrical signals.

The frequency multiplexing section may multiplex the first duo-binary signal and the passband signal.

The band demultiplexing section may demultiplex the frequency-multiplexed signal to obtain the first duo-binary signal and the passband signal.

The data signal recovering section may include a first duo-binary demodulation section for demodulating the first duo-binary signal demultiplexed by the band demultiplexing section and for outputting the first baseband signal. Further, the data signal recovering section may include a band down conversion section for performing frequency conversion for the passband signal demultiplexed by the band demultiplexing section and for outputting the second duo-binary signal. In addition, the data signal recovering section may include a second duo-binary demodulation section for converting the second duo-binary signal output from the band down conversion section to the second baseband signal by demodulation, and may include a signal multiplexing section for recovering the data signal by multiplexing the first duo-binary signal output from the first duo-binary demodulation section and the second duo-binary signal output from the second duo-binary demodulation section.

As a result, it is possible to perform transmission over a narrower frequency band, making it is possible to handle a case in which a frequency response of a transmission path is severely distorted.

Preferably, the data signal splitting section may include a signal splitting section for splitting information included in the data signal into N (N is equal to or greater than three) pieces of information in accordance with a predetermined split ratio corresponding to a frequency response of the optical transmission path and for outputting the resultant N pieces of information as first to $N_{th}$ baseband signals. Further, the data signal splitting section may include first to $N-1_{th}$ band up conversion sections for converting the respective second to $N_{th}$ baseband signals output from the signal splitting section to first to $N-1_{th}$ passband signals having different predetermined frequencies as a center frequency.

The data signal splitting section may output the first baseband signal and the first to $N-1_{th}$ passband signals as the electrical signals.

The frequency multiplexing section may perform frequency multiplexing for the first baseband signal and the first to $N-1_{th}$ passband signals.

The band demultiplexing section may demultiplex the frequency-multiplexed signal to obtain the first baseband signal and the first to $N-1_{th}$ passband signals.

The data signal recovering section may include first to $N-1_{th}$ band down conversion sections for converting the respective first to $N-1_{th}$ passband signals demultiplexed by the band demultiplexing section to the second to $N_{th}$ baseband signals by frequency conversion, and may include a signal multiplexing section for recovering the data signal by multiplexing the first baseband signal demultiplexed by the band demultiplexing section and the second to $N_{th}$ baseband signals converted by the respective band down conversion sections.

As a result, it is possible to perform multiplexing so that an electrical signal is included in a band in which transmission is possible. Thus, it is possible to provide an optical transmission system capable of performing transmission even if a frequency response is severely distorted by chromatic distortion.

Preferably, the data signal splitting section may include a signal splitting section for splitting information included in the data signal into N (N is equal to or greater than three) pieces of information in accordance with a predetermined split ratio corresponding to a frequency response of the optical transmission path and for outputting the resultant N pieces of information as first to $N_{th}$ baseband signals. Further, the data signal splitting section may include first to $N_{th}$ multilevel modulation sections for performing multilevel modulation for the respective first to $N_{th}$ baseband signals output from the signal splitting section in accordance with predetermined M-ary numbers determined based on a frequency response of the optical transmission path and for outputting first to $N_{th}$ multilevel modulation signals.

In addition, the data signal splitting section may include first to $N-1_{th}$ band up conversion sections for converting the second to $N_{th}$ multilevel modulation signals output from the respective second to $N_{th}$ multilevel modulation sections to first to $N-1_{th}$ passband signals having different predetermined frequencies as a center frequency. The data signal splitting section may output the first multilevel modulation signal and the first to $N-1_{th}$ passband signals as the electrical signals. The frequency multiplexing section may perform frequency multiplexing for the first multilevel modulation signal and the first to $N-1_{th}$ passband signals. The band demultiplexing section may demultiplex the frequency-multiplexed signal to obtain the first multilevel modulation signal and the first to $N-1_{th}$ passband signals.

The data signal recovering section may include a first multilevel demodulation section for demodulating the first multilevel modulation signal demultiplexed by the band demultiplexing section, and outputting the first baseband signal. Further, the data signal recovering section may include first to $N-1_{th}$ band down conversion sections for performing frequency conversion for the respective first to $N-1_{th}$ passband signals demultiplexed by the band demultiplexing section and for outputting the respective second to $N_{th}$ multilevel modulation signals. In addition, the data signal recovering section may include second to $N_{th}$ multilevel demodulation sections for converting the respective second to $N_{th}$ multilevel modulation signals output from the band down conversion sections to the second to $N_{th}$ baseband signals. The data signal recovering section may also include a signal multiplexing section for recovering the data signal by multiplexing the first baseband signal output from the first multilevel demodulation section and the second to $N_{th}$ baseband signals output from the respective second to $N_{th}$ multilevel demodulation sections.

As a result, it is possible to perform multiplexing so that an electrical signal is included in a band in which transmission is possible. Thus, it is possible to provide an optical transmission system capable of performing transmission even if a frequency response is severely distorted by chromatic distortion. Also, it is possible to transmit the same amount of information over a narrower frequency band. Thus, it is possible to provide an optical transmission system capable of transmitting a data signal even if a high frequency band is not available for transmission due to severe distortion of a frequency response of an optical transmission path.

Preferably, the data signal splitting section may include a signal splitting section for splitting information included in the data signal into N (N is equal to or greater than three) pieces of information in accordance with a predetermined split ratio corresponding to a frequency response of the optical transmission path and for outputting the resultant N pieces of information as first to $N_{th}$ baseband signals. Further, the data signal splitting section may include first to $N_{th}$ duo-binary modulation sections for performing duo-binary modulation for the respective first to $N_{th}$ baseband signals output from the signal splitting section and for outputting first to $N_{th}$ duo-binary signals. In addition, the data signal splitting section may include and first to $N-1_{th}$ band up conversion sections for converting the second to $N_{th}$ duo-binary signals output from the respective second to $N_{th}$ duo-binary modulation sections to first to $N-1_{th}$ passband signals having different predetermined frequencies as a center frequency. The data signal splitting section may output the first duo-binary signal and the first to $N-1_{th}$ passband signals as the electrical signals.

The frequency multiplexing section may perform frequency multiplexing for the first duo-binary signal and the first to $N-1_{th}$ passband signals.

The band demultiplexing section may demultiplex the frequency-multiplexed signal to obtain the first duo-binary signal and the first to $N-1_{th}$ passband signals.

The data signal recovering section may include a first duo-binary demodulation section for demodulating the first duo-binary signal demultiplexed by the band demultiplexing section and for outputting the first baseband signal, and may include first to $N-1_{th}$ band down conversion sections for performing frequency conversion for the respective first to $N-1_{th}$ passband signals demultiplexed by the band demultiplexing section and for outputting the second to $N_{th}$ duo-binary signals. Further, the data signal recovering section may include a second duo-binary demodulation section for converting the respective second to $N_{th}$ duo-binary signals output from the band down conversion sections to the second to $N_{th}$ baseband signals by demodulation, and may include a signal multiplexing section for recovering the data signal by multiplexing the first baseband signal output from the first duo-binary demodulation section and the second to $N_{th}$ baseband signals output from the respective second to $N_{th}$ duo-binary demodulation sections.

As a result, it is possible to perform multiplexing so that an electrical signal is included in a band in which transmission is possible. Thus, it is possible to provide an optical transmission system capable of performing transmission even if a frequency response is severely distorted by chromatic distortion. Also, it is possible to transmit the same amount of information over a narrower frequency band. Thus, it is possible to provide an optical transmission system capable of transmitting a data signal even if a high frequency band is not available for transmission due to severe distortion of a frequency response of an optical transmission path.

Preferably, the data signal splitting section may include a signal splitting section for splitting information included in the data signal into N (N is equal to or greater than two) pieces of information in accordance with a predetermined split ratio and for outputting the resultant N pieces of information as first to $N_{th}$ baseband signals. Further, the data signal splitting section may include first to $N_{th}$ modulation sections provided for the first to $N_{th}$ baseband signals, respectively, output from the signal splitting section for modulating the first to $N_{th}$ baseband signals by a predetermined scheme and for outputting the first to $N_{th}$ modulation signals. In addition, the data signal splitting section may include first to $N_{th}$ band up conversion sections for converting the respective first to $N_{th}$ modulation signals output from the first to $N_{th}$ modulation sections to first to $N_{th}$ electrical signals having different predetermined frequencies as a center frequency and for outputting the resultant electrical signals.

The frequency multiplexing section may perform frequency multiplexing for the first to $N_{th}$ electrical signals.

The band demultiplexing section may demultiplex the frequency-multiplexed signal to obtain the first to $N_{th}$ electrical signals.

The data signal recovering section may include first to $N_{th}$ band down conversion sections for converting the respective first to $N_{th}$ electrical signals demultiplexed by the band demultiplexing section to the first to the $N_{th}$ modulation signals by frequency conversion, and may include first to $N_{th}$ demodulation sections for demodulating the respective first to $N_{th}$ modulation signals output from the first to $N_{th}$ band up conversion sections and for outputting the first to $N_{th}$ baseband signals. Further, the data signal recovering section may include a signal multiplexing section for recovering the data signal by multiplexing the first to $N_{th}$ baseband signals output from the respective first to $N_{th}$ demodulation sections.

The optical receiving device may further include first to $N_{th}$ level detecting sections for detecting levels of the first to $N_{th}$ modulation signals output from the respective first to $N_{th}$ band down conversion sections. Further, the optical receiving device may further include a modulation control section for controlling a modulation scheme used in each of the first to $N_{th}$ modulation sections based on the levels of the first to $N_{th}$ modulation signals detected by the respective first to $N_{th}$ level detecting sections.

As a result, even if there is a frequency at which a frequency response is severely distorted due to chromatic dispersion, etc., in a band corresponding to a transmission rate, transmission is performed by changing a modulation scheme in accordance with a frequency response in each split band, making it is possible to perform transmission. Thus, a transmission range extends without using a chromatic dispersion compensation optical device.

Preferably, the modulation control section may cause a modulation section corresponding to any of the first to $N_{th}$ modulation signals to stop sending the modulation signal if a signal level thereof, which is detected by any of the first to $N_{th}$ level detecting sections, is equal to or smaller than a predetermined value.

As a result, it is possible to perform transmission while avoiding a frequency band at which transmission is impossible due to severe distortion of a frequency response.

Preferably, the data signal splitting section may include a signal splitting section for splitting information included in the data signal into N (N is equal to or greater than two) pieces of information in accordance with a predetermined split ratio and for outputting the resultant N pieces of information as first to $N_{th}$ baseband signals. Further, the data signal splitting section may include first to $N_{th}$ modulation sections provided for the first to $N_{th}$ baseband signals, respectively, output from the signal splitting section for modulating the first to $N_{th}$ baseband signals by a predetermined scheme and for outputting the first to $N_{th}$ modulation signals, and may also include first to $N_{th}$ band up conversion sections for converting the respective first to $N_{th}$ modulation signals output from the first to $N_{th}$ modulation sections to first to $N_{th}$ electrical signals having different predetermined frequencies as a center frequency, and outputting the resultant electrical signals.

The frequency multiplexing section may perform frequency multiplexing for the first to $N_{th}$ electrical signals.

The band demultiplexing section may demultiplex the frequency-multiplexed signal to obtain the first to $N_{th}$ electrical signals.

The data signal recovering section may include first to $N_{th}$ band down conversion sections for converting the first to $N_{th}$ electrical signals demultiplexed by the band demultiplexing section to the first to the $N_{th}$ modulation signals by frequency conversion, and may also include first to $N_{th}$ demodulation sections for demodulating the respective first to $N_{th}$ modulation signals output from the first to $N_{th}$ band up conversion sections and for outputting the first to $N_{th}$ baseband signals. Further, the data signal recovering section may include a signal multiplexing section for recovering the data signal by multiplexing the first to $N_{th}$ baseband signals output from the respective first to $N_{th}$ demodulation sections.

The optical receiving device may further include first to $N_{th}$ error detecting sections for detecting error rates of the first to $N_{th}$ baseband signals output from the respective first to $N_{th}$ demodulation sections, and may include a modulation control section for controlling a modulation scheme used in each of the first to $N_{th}$ modulation sections based on the error rates of the first to $N_{th}$ baseband signals detected by the respective first to $N_{th}$ error detecting sections.

As a result, even if there is a frequency at which a frequency response is severely distorted due to chromatic dispersion, etc., in a band corresponding to a transmission rate, transmission is performed by changing a modulation scheme in accordance with a frequency response in each split band, making it is possible to perform transmission. Thus, a transmission range extends without using a chromatic dispersion compensation optical device.

Preferably, the modulation control section may cause a modulation section corresponding to any of the first to $N_{th}$ baseband signals to stop sending the modulation signal if an error rate thereof, which is detected by any of the first to $N_{th}$ error detecting section, is equal to or smaller than a predetermined value.

As a result, it is possible to perform transmission while avoiding a frequency band at which transmission is impossible due to severe distortion of a frequency response.

A second aspect of the present invention is directed to an optical transmitting device for converting an inputted data signal to an optical signal and outputting the optical signal to an optical transmission path.

The optical transmitting device includes a data signal splitting section for splitting information included in the data signal into at least two pieces of information and for generating at least two electrical signal shaving different center frequencies and bands. The optical transmitting device also includes a frequency multiplexing section for performing frequency multiplexing for the at least two electrical signals generated by the data signal splitting section, and includes an electrical-to-optical conversion section for converting the frequency-multiplexed signal generated by the frequency multiplexing section to an optical signal, and for sending the optical signal to the optical transmission path.

The data signal splitting section generates the at least two electrical signals so that the electrical signals are located in different frequency bands away from a local minimum in a frequency response of the optical transmission path.

A third aspect of the present invention is directed to an optical receiving device for receiving, from an optical transmitting device converting an inputted data signal into an optical signal, the optical signal transmitted via an optical transmission path and for converting the optical signal to the data signal. The optical transmitting device converts a frequency-multiplexed signal of at least two electrical signals, which are generated so as to be located in different frequency bands away from a local minimum in a frequency response of the optical transmission path, to the optical signal.

The optical receiving device includes an optical-to-electrical conversion section for converting the optical signal transmitted via the optical transmission path to the frequency-multiplexed signal, and includes a band demultiplexing section for demultiplexing the frequency-multiplexed signal output from the optical-to-electrical conversion section to obtain the at least two electrical signals. Further, the optical receiving device includes a data signal recovering section for recovering the data signal based on the at least two electrical signals demultiplexed by the band demultiplexing section.

A fourth aspect of the present invention is directed to a split-band optical transmission method for sending an optical signal, which is converted from an inputted data signal, to an optical transmission path and for receiving the optical signal transmitted via the optical transmission path and converting the optical signal to the data signal. The method includes splitting information included in the data signal into two pieces of information, and generating at least two electrical signals having different center frequencies and bands so as to be located in different frequency bands away from a local minimum in a frequency response of the optical transmission path. The method also includes performing frequency multiplexing for the generated at least two electrical signals, converting the frequency-multiplexed signal to an optical signal and sending the optical signal to the optical transmission path, converting the optical signal transmitted via the optical transmission path to the frequency-multiplexed signal, demultiplexing the frequency-multiplexed signal to obtain the at least two electrical signals, and recovering the data signal based on the demultiplexed at least two electrical signals.

BRIEF DESCRIPTION OF THE DRAWINGS

FIG. 17A is an illustration showing a frequency response of the electrical-to-optical conversion section 14.

FIG. 17B is an illustration showing a frequency response of an optical transmission path.

FIG. 17C is an illustration showing exemplary frequency bands of signals output from band up conversion sections 121 to 124 which correspond to modulation sections 191 to 194, respectively.

DETAILED DESCRIPTION OF THE INVENTION

Hereinafter, embodiments of the present invention will be described in detail with reference to the drawings.

First Embodiment

Figure 1:
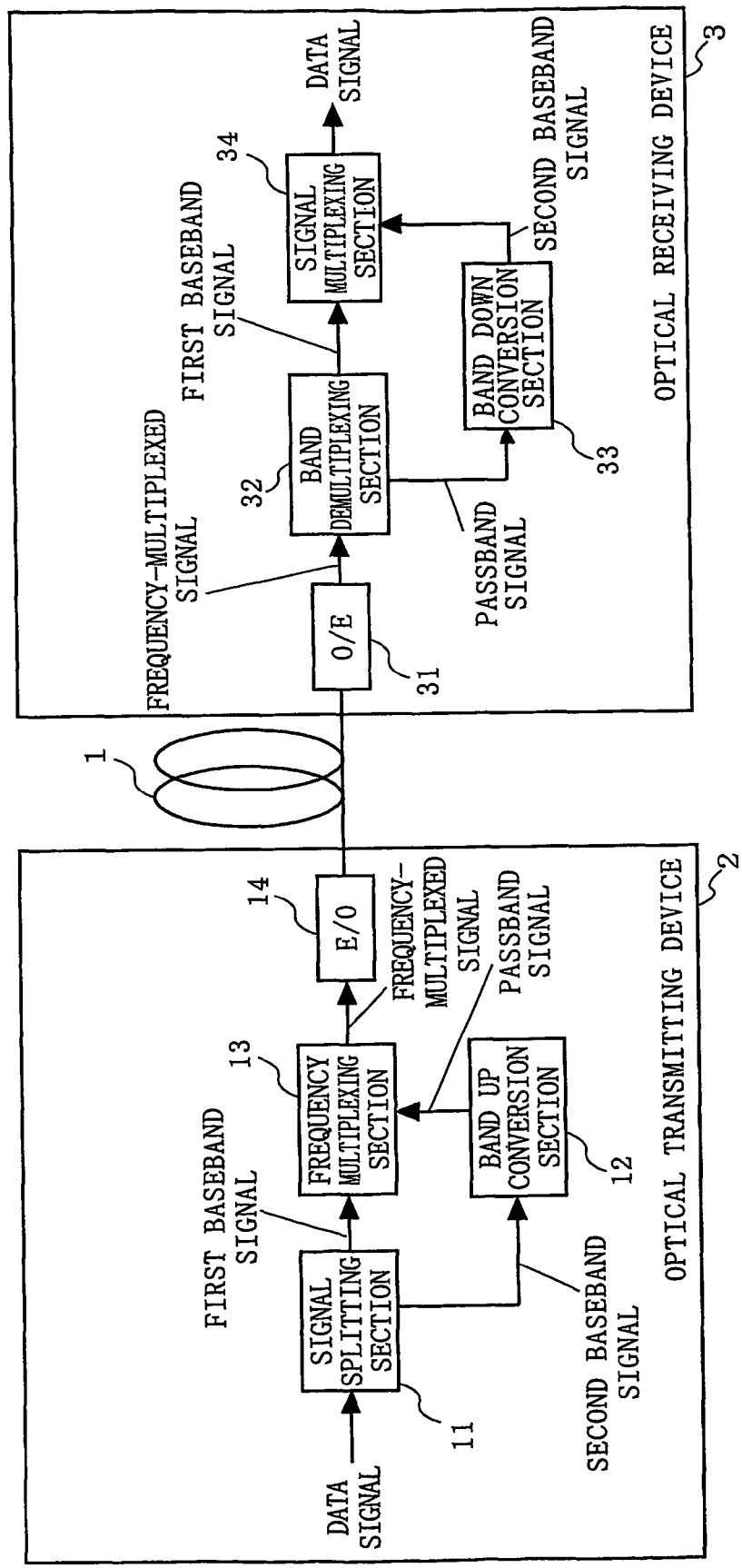
FIG. 1 is a block diagram showing a structure of a split-band optical transmission system according to a first embodiment of the present invention.

FIG. 1 is a block diagram showing a structure of a split-band optical transmission system according to a first embodiment of the present invention. In FIG. 1, the split-band optical transmission system includes a signal splitting section 11, a band up conversion section 12, a frequency multiplexing section 13, an electrical-to-optical conversion section 14, an optical fiber 1, an optical-to-electrical conversion section 31, a band demultiplexing section 32, a band down conversion section 33, and a signal multiplexing section 34. An optical transmitting device 2 is composed of the signal splitting section 11, the band up conversion section 12, the frequency multiplexing section 13, and the electrical-to-optical conversion section 14. An optical receiving device 3 is composed of the optical-to-electrical conversion section 31, the band demultiplexing section 32, the band down conversion section 33, and the signal multiplexing section 34.

Next, with reference to FIG. 1, a function of each component of the first embodiment will be described.

The signal splitting section 11 splits information included in an inputted data signal into two pieces of information based on a split ratio which is previously determined in accordance with a frequency response of an optical transmission path, and outputs the resultant two pieces of information as a first baseband signal and a second baseband signal. The band up conversion section 12 performs frequency conversion for the second baseband signal so as to shift a center frequency of the second baseband signal to a predetermined frequency, and outputs a passband signal. The first baseband signal and the passband signal are electrical signals having different center frequencies and bands. These two electrical signals are located in different frequency bands away from a local minimum in the frequency response of the optical transmission path. The frequency multiplexing section 13 performs frequency multiplexing for the first baseband signal and the passband signal, and outputs a frequency-multiplexed signal. The electrical-to-optical conversion section 14 converts the frequency-multiplexed signal output from the frequency multiplexing section 13 to an optical signal, and sends it to the optical fiber 1.

The optical-to-electrical conversion section 31 converts the optical signal transmitted over the optical fiber 1 to a frequency-multiplexed signal, which is an electrical signal.

The band demultiplexing section 32 demultiplexes the frequency-multiplexed signal to obtain the first baseband signal and the passband signal. The band down conversion section 33 performs frequency conversion for the passband signal, and outputs the second baseband signal. The signal multiplexing section 34 multiplexes the first baseband signal and the second baseband signal to recover the data signal.

Hereinafter, with reference to FIGS. 2A to 2E, a frequency location of signals in the split-band optical transmission system according to the first embodiment will be described. In FIGS. 2A to 2E, a horizontal axis represents a frequency of an electrical signal input to the optical transmitting device, and a vertical axis represents the level of the electrical signal.

Figure 2A:
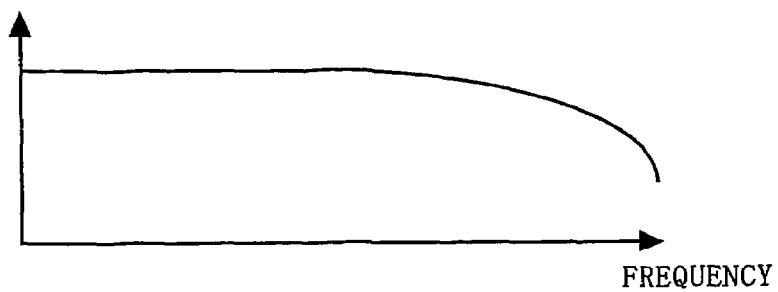
FIG. 2A is an illustration showing a frequency response of an electrical-to-optical conversion section 14.

FIG. 2A is an illustration showing a frequency response of the electrical-to-optical conversion section 14. As shown in FIG. 2A, assume that the electrical-to-optical conversion section 14 has a band which is adequately wider than a data signal to be transmitted.

Figure 2B:
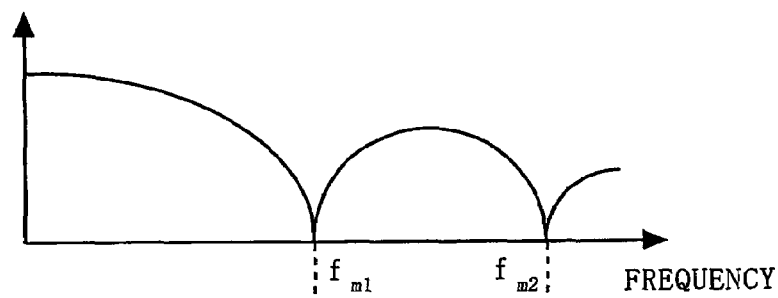
FIG. 2B is an illustration showing a frequency response of an optical transmission path composed of an optical fiber 1, the electrical-to-optical conversion section 14, and an optical-to-electrical conversion section 31.

FIG. 2B is an illustration showing a frequency response of the optical transmission path composed of the optical fiber 1, the electrical-to-optical conversion section 14, and the optical-to-electrical conversion section 31. As mentioned in the BACKGROUND OF THE INVENTION section, a frequency response of the optical transmission path is distorted under the influence of chromatic dispersion, and local minimums appear at frequencies $f_{m1}$ and $f_{m2}$ in the frequency response, as shown in FIG. 2B. An optical transmission path's frequency response G (f) at a frequency f is obtained by the following equation 1.

$$G(f) = G_{Tx}(f) \cdot G_{Rx}(f) \cdot L \cdot \frac{\cos\left[\frac{\pi\lambda^2 Dzf^2}{c}\right]}{\cos[\arctan(\alpha)]} \quad \text{[equation 1]}$$

Here, $G_{Tx}$ (f) represents a frequency response of the electrical-to-optical conversion section 14, $G_{Rx}$ (f) represents a frequency response of the optical-to-electrical conversion section 31, L represents fiber loss, $\lambda$ represents a light wavelength, D represents chromatic dispersion of an optical fiber, z represents a transmission range, c represents the speed of light, and a represents an α parameter of a direct modulation laser or an external modulator, which are used as the electrical-to-optical conversion section 14. Based on the equation 1, a $k_{th}$ local minimum frequency $f_{mk}$ is obtained by the following equation 2.

$$f_{mk} = \frac{c}{2\lambda^2 Dz}\left[1 + 2k - \frac{2}{\pi}\arctan(\alpha)\right] \quad \text{[equation 2]}$$

Figure 2C:
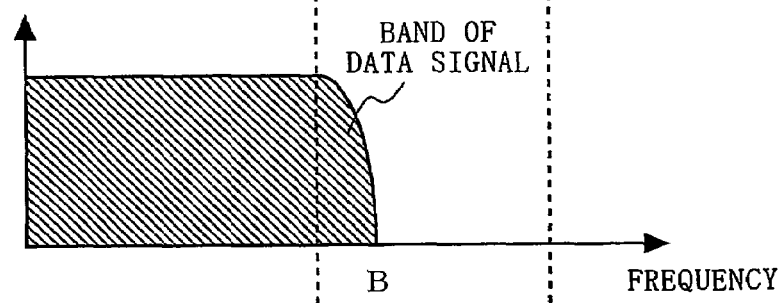
FIG. 2C is an illustration showing a signal band used by an inputted data signal.

FIG. 2C is an illustration showing a signal band used by an inputted data signal. As shown in FIG. 2C, in the case where the frequency $f_{m1}$ corresponding to a first local minimum is smaller than a transmission rate B, that is, in the case where the first local minimum frequency $f_{m1}$ is included in a signal band of the data signal, a frequency response is distorted at the local minimum if electrical/optical conversion is directly performed for the inputted data signal in a similar manner to the conventional system. Thus, in the first embodiment, a signal band of the inputted data signal is split before frequency conversion and multiplexing, thereby preventing the resultant signals from being located in the local minimums in the frequency response of the optical transmission path. As a result, it is possible to avoid the influence of the distortion caused by chromatic dispersion, whereby a transmission is enabled.

Figure 2D:
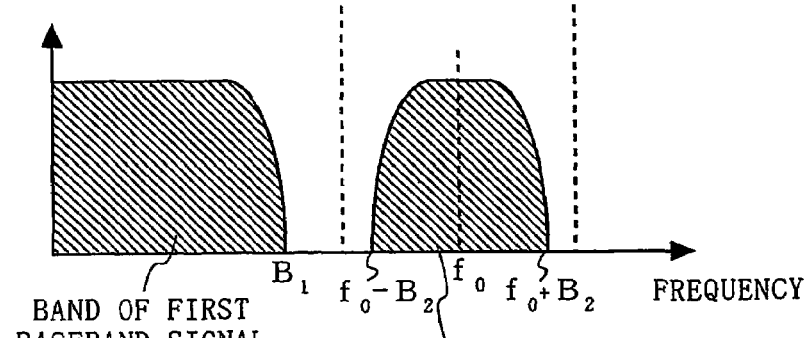
FIG. 2D is an illustration showing a signal band used by a frequency-multiplexed signal.

FIG. 2D is an illustration showing a signal band used by a frequency-multiplexed signal. As shown in FIG. 2D, the first baseband signal is assigned to a frequency band, which is smaller than the first local minimum frequency $f_{m1}$, and is away from the frequency $f_{m1}$ at a distance corresponding to a predetermined band so as to maintain an adequate level of the frequency response. Also, the passband signal is assigned to a frequency band, which is greater than the first local minimum frequency $f_{m1}$ and smaller than the second local minimum frequency $f_{m2}$, and away from each of the frequencies $f_{m1}$ and $f_{m2}$ at a distance corresponding to a predetermined band so as to maintain an adequate level of the frequency response. Thus, the predetermined split ratio used in the signal splitting section is determined based on a ratio between a bandwidth of a baseband up to the first frequency $f_{m1}$ and a bandwidth of a passband from the first frequency $f_{m1}$ to the second frequency $f_{m2}$.

Figure 2E:
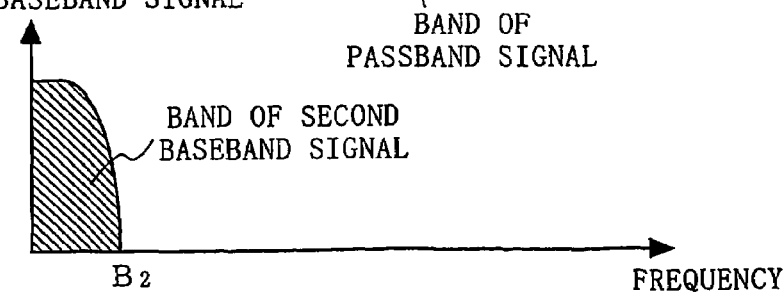
FIG. 2E is an illustration showing a band of a second baseband signal.

FIG. 2E is an illustration showing a band of the second baseband signal. Assume that a transmission rate of the first baseband signal is $B_1$, and a transmission rate of the second baseband signal is $B_2$. The signal splitting section 11 splits a data signal so as to satisfy a relationship of an equation 3 shown below. Here, assume that the transmission rates $B_1$ and $B_2$ are previously determined in accordance with the frequency response (see FIG. 2B) of the optical transmission path.

$$B_1+B_2=B \quad \text{[equation 3]}$$

When the band up conversion section 12 outputs a passband signal after performing frequency conversion for the second baseband signal, the band up conversion section 12 sets a frequency band of the passband signal between the first local minimum frequency $f_{m1}$ and the second local minimum frequency $f_{m2}$ of the frequency response of the optical transmission path. That is, assume that a center frequency of the passband signal is $f_0$, the band up conversion section 12 converts the second baseband signal to a passband signal so that an upper limit of the frequency band of the passband signal is $f_0+B_2$, and a lower limit thereof is $f_0-B_2$. Here, the band up conversion section 12 sets $f_0+B_2$ so as to be smaller than $f_{m2}$, and sets $f_0-B_2$ so as to be greater than $f_{m1}$. Also, $f_{m1}$ and $f_0-B_2$ are away from each other so as to maintain an adequate level of the frequency response. Similarly, $f_{m2}$ and $f_0+B_2$ are away from each other so as to maintain an adequate level of the frequency response.

Hereinafter, with reference to FIGS. 2C to 2E, an operation of the split-band optical transmission system according to the first embodiment will be described. An inputted data signal (see FIG. 2C) is split by the signal splitting section 11 into a first baseband signal whose transmission rate is $B_1$ and a second baseband signal (see FIG. 2E) whose transmission rate is $B_2$. The second baseband signal is up-converted by the band up conversion section 12 so as to have a center frequency $f_0$, and is converted to a passband signal. Frequency multiplexing is performed for the first baseband signal and the passband signal by the frequency multiplexing section 13, and the resultant signal is output as a frequency-multiplexed signal (see FIG. 2D). The frequency-multiplexed signal output from the frequency multiplexing section 13 is converted to an optical signal by the electrical-to-optical conversion section 14, and sent to the optical fiber 1.

The optical signal transmitted over the optical fiber 1 is converted to a frequency-multiplexed signal (see FIG. 2D) by the optical-to-electrical conversion section 31. The frequency-multiplexed signal is demultiplexed to obtain the first baseband signal and the passband signal by the band demultiplexing section 32. The passband signal demultiplexed by the band demultiplexing section 32 is down-converted by the band down conversion section 33, and is converted to the second baseband signal (see FIG. 2E). Then, the first baseband signal and the second baseband signal are multiplexed by the signal multiplexing section 34, and the resultant signal is output as a data signal.

Figure 3:
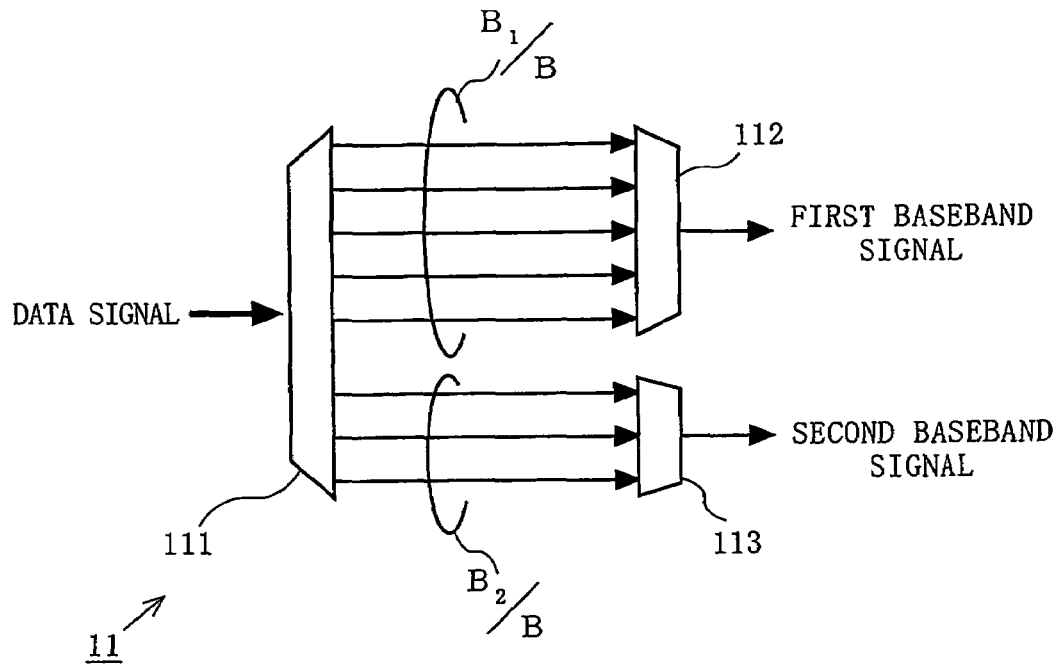
FIG. 3 is a block diagram showing a structure of a signal splitting section 11.

FIG. 3 is a block diagram showing a structure of the signal splitting section 11. The signal splitting section 11 includes a first serial-to-parallel conversion section 111, a first parallel-to-serial conversion section 112, and a second parallel-to-serial conversion section 113.

The first serial-to-parallel conversion section 111 converts a data signal to parallel data, and outputs the parallel data. Among the parallel data output from the first serial-to-parallel conversion section 111, the first parallel-to-serial conversion section 112 converts a portion of the parallel data corresponding to $B_1/B$ to serial data, and outputs the serial data as a first baseband signal. Among the parallel data output from the first serial-to-parallel conversion section 111, the second parallel-to-serial conversion section 113 converts a portion of the parallel data corresponding to $B_2/B$ to serial data, and outputs the serial data as a second baseband signal. Assume that the above-described split ratio $(B_1/B, B_2/B)$ of the parallel data is previously determined based on the transmission rates $B_1$ and $B_2$, which are previously determined in accordance with the frequency response (see FIG. 2B) of the optical transmission path, and the equation 3.

Figure 4:
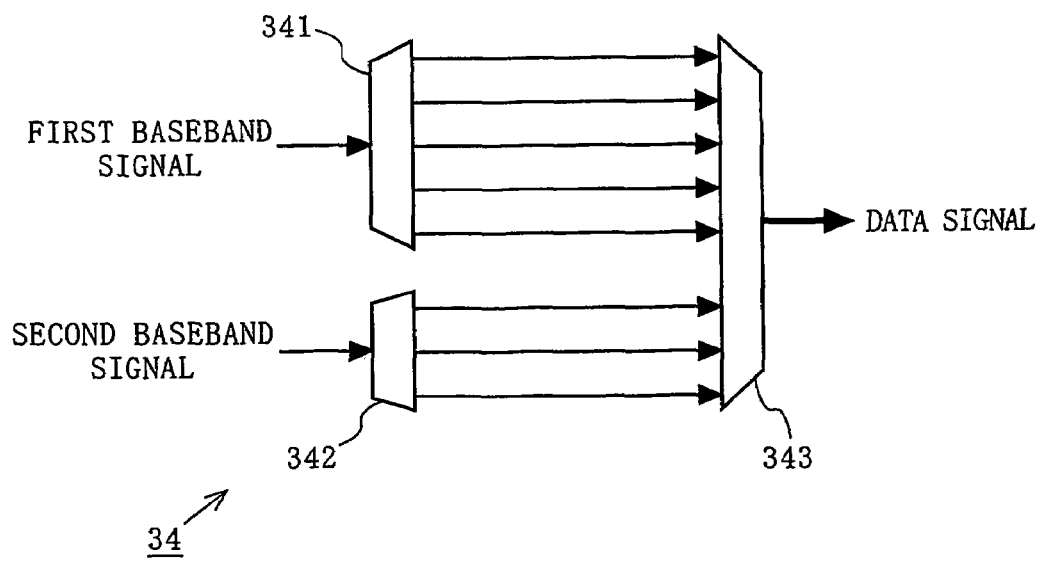
FIG. 4 is a block diagram showing a structure of a signal multiplexing section 34.

FIG. 4 is a block diagram showing a structure the signal multiplexing section 34. The signal multiplexing section 34 includes a second serial-to-parallel conversion section 341, a third serial-to-parallel conversion section 342, and a third parallel-to-serial conversion section 343.

The second serial-to-parallel conversion section 341 converts a first baseband signal, which is serial data, to parallel data, and outputs the resultant parallel data. The third serial-to-parallel conversion section 342 converts a second baseband signal, which is serial data, to parallel data, and outputs the resultant parallel data. The third parallel-to-serial conversion 343 multiplexes the parallel data output from the second serial-to-parallel conversion section 341 and the parallel data output from the third serial-to-parallel conversion section 342 to obtain serial data, and outputs a data signal.

Figure 5:
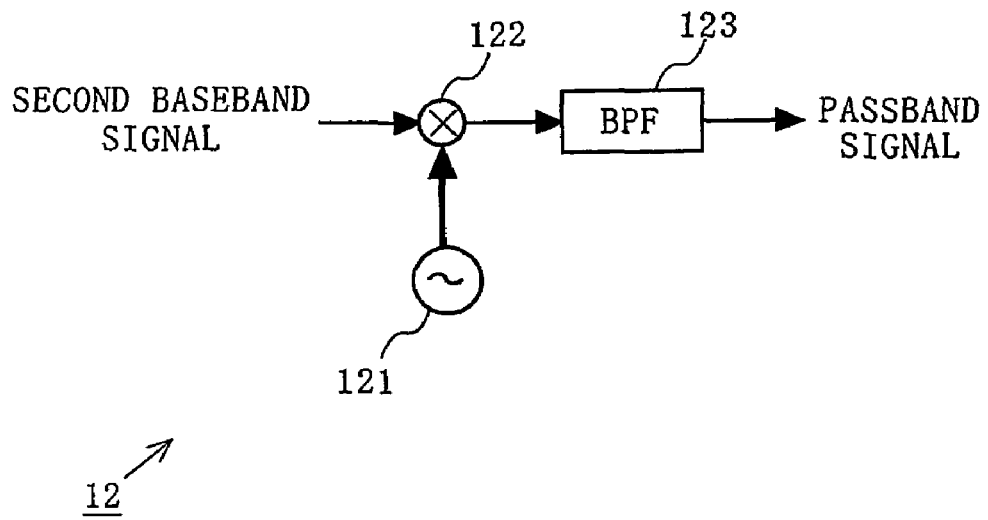
FIG. 5 is a block diagram showing a structure of a band up conversion section 12.

FIG. 5 is a block diagram showing a structure of the band up conversion section 12. In FIG. 5, the band up conversion section 12 includes a first sine wave oscillator 121, a first mixer 122, and a band-pass filter 123.

The first sine wave oscillator 121 outputs a sine wave signal with a frequency $f_0$. The first mixer 122 multiplies a second baseband signal, which is input to the band up conversion section 12, by the sine wave signal, thereby performing frequency conversion for the second baseband signal to obtain a passband signal with a center frequency $f_0$. The band-pass filter 123 removes the second baseband signal from a signal output from the first mixer 122, and outputs only a passband signal. Note that what is required of the band up conversion section 12 is to perform frequency conversion for a second baseband signal to obtain a passband signal, and a structure thereof is not limited to the structure shown in FIG. 5.

Figure 6:
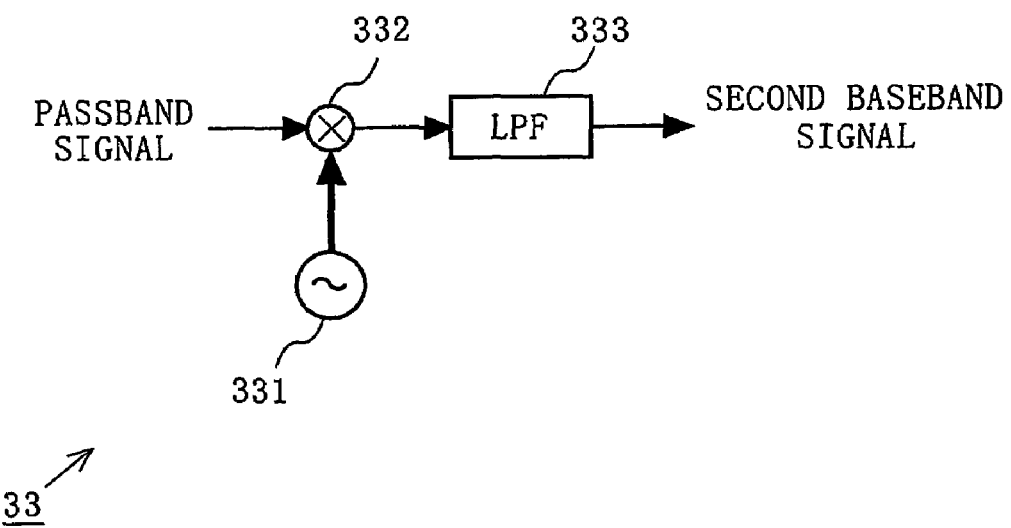
FIG. 6 is a block diagram showing a structure of a band down conversion section 33.

FIG. 6 is a block diagram showing a structure of the band down conversion section 33. In FIG. 6, the band down conversion section 33 includes a second sine wave oscillator 331, a second mixer 332, and a low-pass filter 333.

The second sine wave oscillator 331 outputs a sine wave signal with a frequency $f_0$. The second mixer 332 multiplies a passband signal by the sine wave signal, thereby performing frequency conversion for the passband signal to obtain a second baseband signal. The low-pass filter 333 removes the passband signal from a signal output from the second mixer 332, and outputs only a second baseband signal. Note that what is required of the band down conversion section 33 is to perform frequency conversion for a passband signal to obtain a second baseband signal, and a structure thereof is not limited to the structure shown in FIG. 6.

In the above descriptions, it is assumed that an object of the present invention is to solve a problem of distortion of a frequency response caused by chromatic dispersion. However, a cause of distortion of a frequency response is not limited to chromatic distortion. For example, in the case where a reflecting spot lies in electrical wiring inside the optical transmitter or optical receiver, a frequency response may be severely distorted. In order to solve a problem of distortion of a frequency response caused by such a factor other than chromatic dispersion, it is effective to use the structure described in the present embodiment.

As such, in the first embodiment, the optical transmission system generates and multiplexes two electrical signals (a first baseband signal and a passband signal) for transmitting the resultant signal while avoiding a frequency at which a frequency response is severely distorted by chromatic distortion, etc., in a band corresponding to a transmission rate of a data signal. Thus, the optical transmission system according to the first embodiment enables high-speed, long range, and high-quality transmission of an optical signal from the optical transmitting device to the optical receiving device even under poor channel conditions of the optical transmission path without using a chromatic dispersion compensation optical device.

Note that the signal splitting section 11 and the band up conversion section 12 are data signal splitting sections for splitting information included in a data signal into at least two pieces of information, and generating at least two electrical signals having different center frequencies and bands. Also, the band down conversion section 33 and the signal multiplexing section 34 are data signal recovering sections for recovering a data signal based on at least two electrical signals demultiplexed by the band demultiplexing section 32.

Note that the band demultiplexing section 32 may be composed of a branch device for dividing a frequency-multiplexed signal into two, a low-pass filter for removing a first baseband signal from one of the two frequency-multiplexed signals, and a high-pass filter (or a band-pass filter) for removing a passband signal from the other frequency-multiplexed signal.

Figure 7:
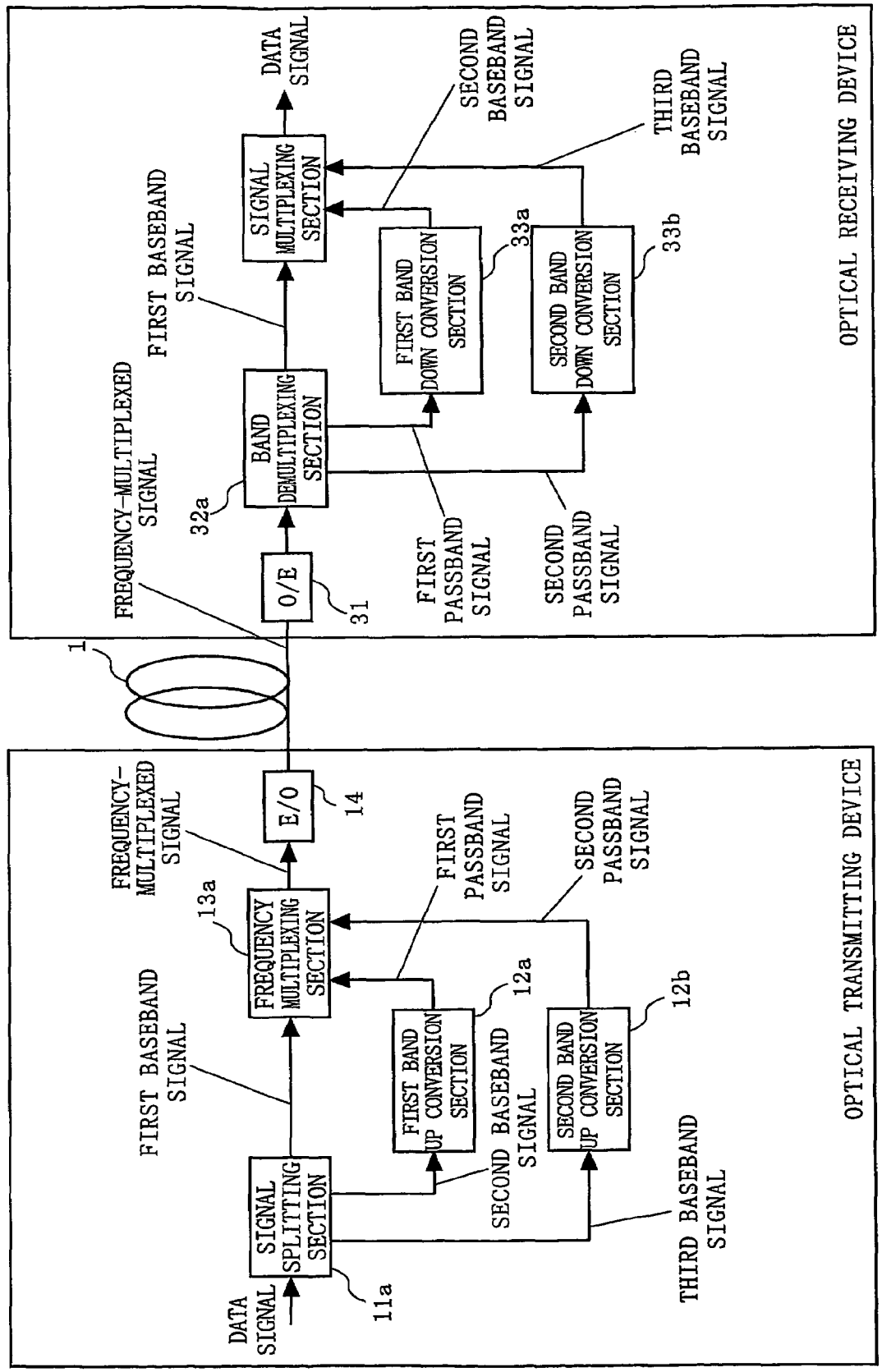
FIG. 7 is a block diagram showing a configuration of an optical transmission system in which a data signal is split into three bands before frequency multiplexing and transmission.

In the case where it is impossible to set the upper limit $f_0+b_2$ of a passband signal band so as to be smaller than the second local minimum frequency $f_{m2}$ since there is a shortage of a bandwidth even by the above-described method due to the influence of the distortion caused by chromatic dispersion, such a problem can be solved by the following configuration. FIG. 7 is an illustration showing such a configuration.

In FIG. 7, the split-band optical transmission system includes a signal splitting section 11a, a first band up conversion section 12a, a second band up conversion section 12b, a frequency multiplexing section 13a, the electrical-to-optical conversion section 14, the optical fiber 1, the optical-to-electrical conversion section 31, a band demultiplexing section 32a, a first band down conversion section 33a, a second band down conversion section 33b, and a signal multiplexing section 34a.

Figure 8A:
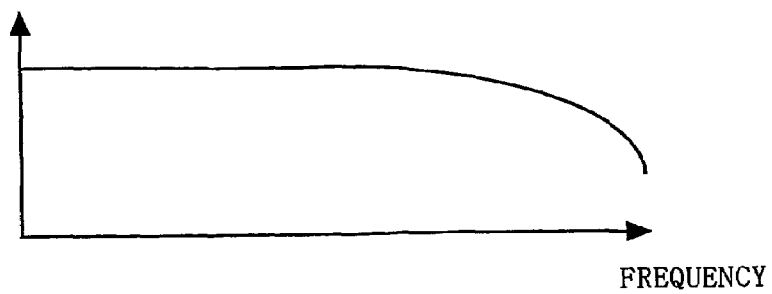
FIG. 8A is an illustration showing a frequency response of the electrical-to-optical conversion section 14.
Figure 8B:
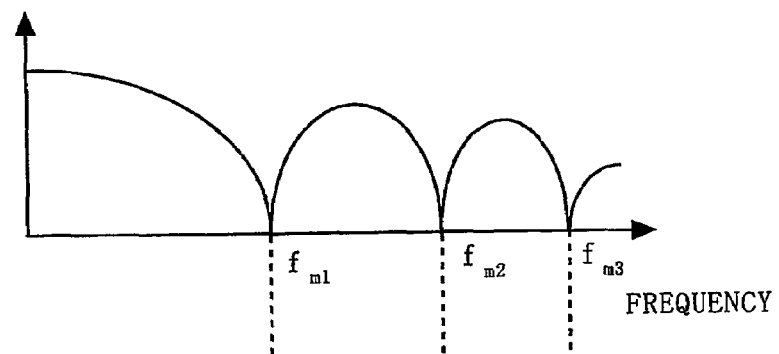
FIG. 8B is an illustration showing a frequency response of an optical transmission path.
Figure 8C:
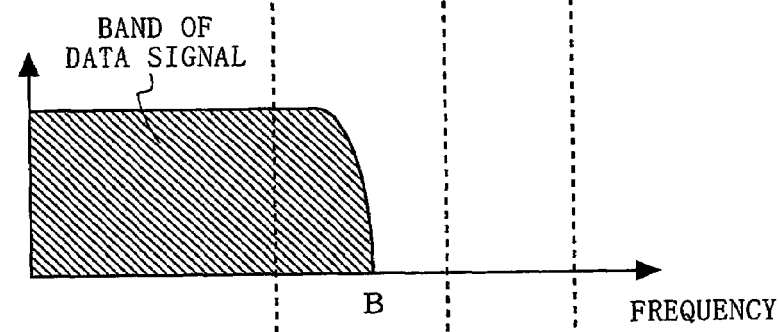
FIG. 8C is an illustration showing a band used by an inputted data signal.
Figure 8D:
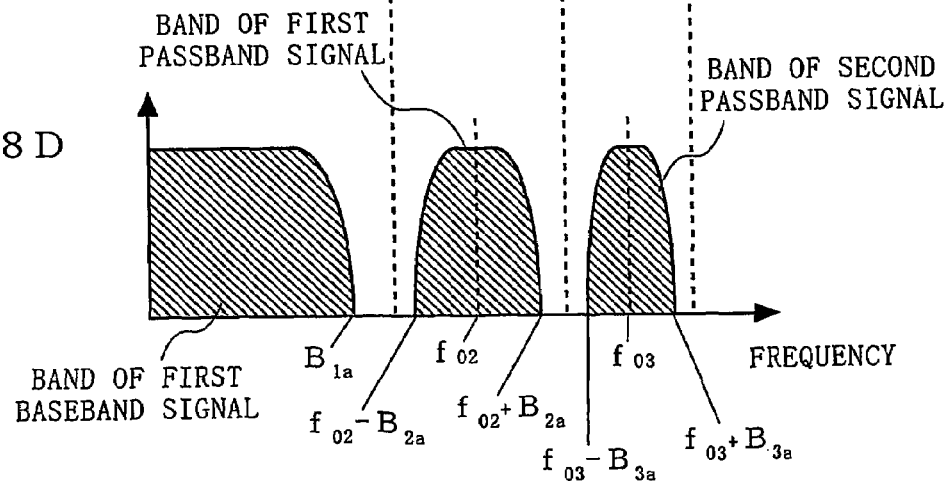
FIG. 8D is an illustration showing a signal band used by a frequency-multiplexed signal.

FIG. 8A is an illustration showing a frequency response of the electrical-to-optical conversion section 14. FIG. 8B is an illustration showing a frequency response of an optical transmission path. In this case, it is assumed that it is impossible to set the upper limit $f_0+B_2$ of a passband signal band, which is shown in FIG. 2C, so as to be smaller than the second local minimum frequency $f_{m2}$. Thus, there is another local minimum at frequency $f_{m3}$, which is higher than the local minimum frequency $f_{m2}$. FIG. 8C is an illustration showing a band used by an inputted data signal. FIG. 8D is an illustration showing a signal band used by a frequency-multiplexed signal.

First, the signal splitting section 11a splits a data signal into three, and outputs the resultant signals as first to third baseband signals whose transmission rates are $B_{1a}$, $B_{2a}$, and $B_{3a}$, respectively. The first band up conversion section 12a converts the second baseband signal to a first passband signal whose center frequency is frequency $f_{02}$. The second band up conversion section 12a converts the third baseband signal to a second passband signal whose center frequency is frequency $f_{03}$. As a result, the bands of the first baseband signal, the first passband signal, and the second passband signal are shown in FIG. 8D. That is, $B_{1a}$ is set at a frequency smaller than the first local minimum frequency $f_{m1}$ so as to maintain an adequate level of the frequency response. $B_{2a}$ and $f_{02}$ are set at frequencies so that a band of the second passband signal is located between the first local minimum frequency $f_{m1}$ and the second local minimum frequency $f_{m2}$, and an adequate level of the frequency response can be maintained. $B_{3a}$ and $f_{03}$ are set at frequencies so that a band of the third passband signal is located between the second local minimum frequency $f_{m2}$ and the third local minimum frequency $f_{m3}$, and an adequate level of the frequency response can be maintained.

As such, a data signal is split into three bands, two passband signals and one baseband signal are multiplexed, and the resultant signal is transmitted, thereby providing a system capable of handling a case in which a data signal cannot be transmitted successfully by splitting the data signal into two bands.

Note that, in the case where there still is a shortage of a bandwidth even by the above-described method, the number of splits of a data signal may be increased, thereby setting bands in similar manners. Specifically, the optical transmitting device includes: a signal splitting section for splitting information included in a data signal into N (N is equal to or greater than three) pieces of information in accordance with a split ratio corresponding to a frequency response of the optical transmission path and outputting the resultant N pieces of information as first to $N_{th}$ baseband signals; first to $N-1_{th}$ band up conversion sections for converting the respective second to $N_{th}$ baseband signals to first to $N-1_{th}$ passband signals having different predetermined center frequencies; and a frequency multiplexing section for performing frequency conversion using the first baseband signal and the first to $N-1_{th}$ passband signals as electrical signals.

The optical receiving device includes: a band demultiplexing section for demultiplexing a frequency-multiplexed signal to obtain the first baseband signal and the first to $N-1_{th}$ passband signals; first to $N-1_{th}$ band down conversion sections for performing frequency conversion for the respective first to $N-1_{th}$ passband signals demultiplexed by the band demultiplexing section to obtain the second to $N_{th}$ baseband signals; and a signal multiplexing section for multiplexing the first baseband signal and the second to $N_{th}$ baseband signals converted by the respective band down conversion sections to recover the data signal. In this case, in order to locate the first baseband signal and the first to $N-1_{th}$ passband signals in the respective frequency bands away from a local minimum in the frequency response of the optical transmission path, the optical transmitting device may split information into N pieces of information in the signal splitting section, and perform up-conversion in the band up conversion section.

Note that a passband signal may be a signal for which single side-band modulation is performed.

Second Embodiment

Figure 9:
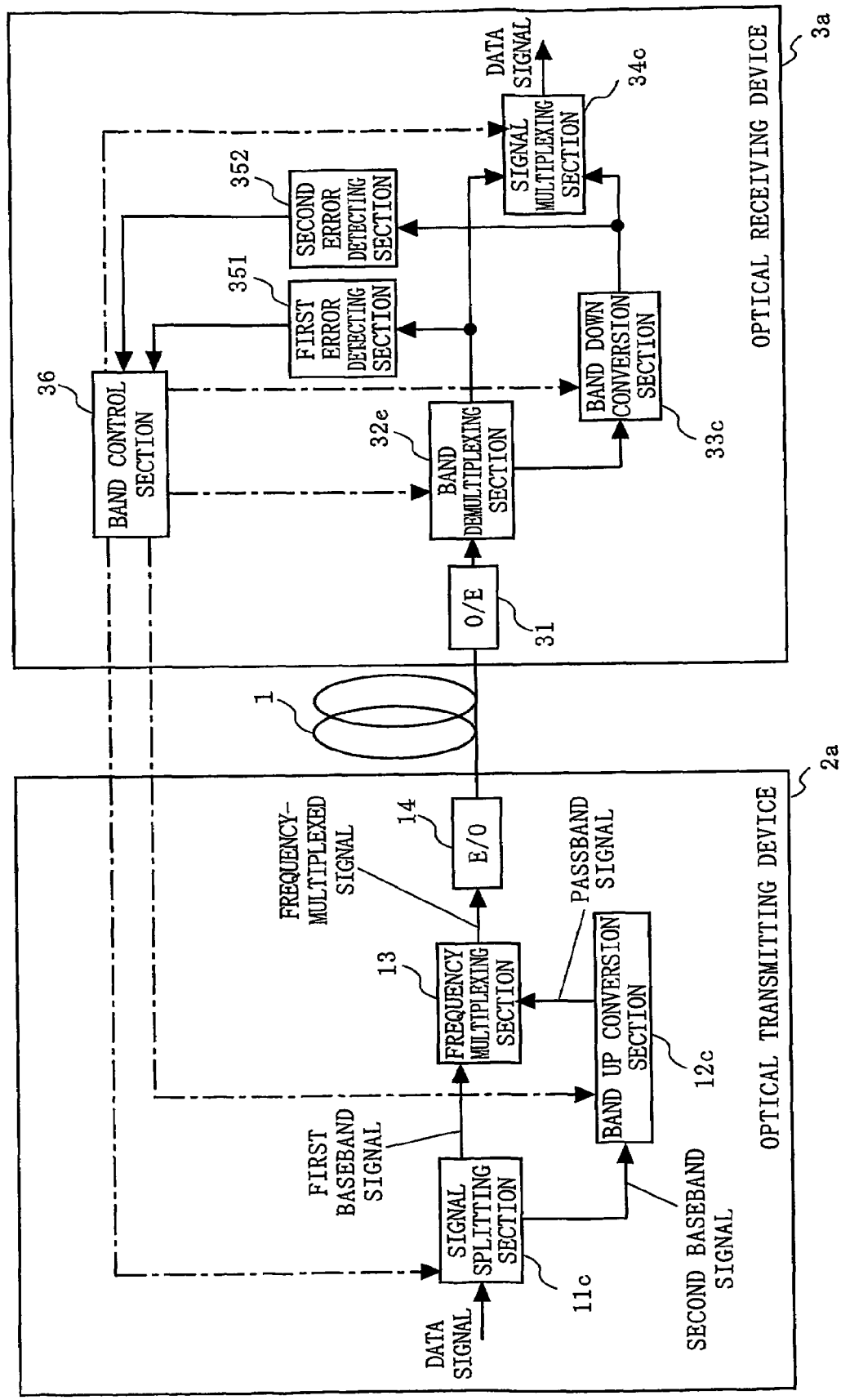
FIG. 9 is a block diagram showing a configuration of a split-band optical transmission system according to a second embodiment of the present invention.

FIG. 9 is a block diagram showing a configuration of a split-band optical transmission system according to a second embodiment of the present invention. In FIG. 9, the split-band optical transmission system includes a signal splitting section 11c, a band up conversion section 12c, the frequency multiplexing section 13, the electrical-to-optical conversion section 14, the optical fiber 1, the optical-to-electrical conversion section 31, a band demultiplexing section 32c, a band down conversion section 33c, a signal multiplexing section 34c, a first error detecting section 351, a second error detecting section 352, and a band control section 36. An optical transmitting device 2a is composed of the signal splitting section 11c, the band up conversion section 12c, the frequency multiplexing section 13, and the electrical-to-optical conversion section 14. An optical receiving section 3a is composed of the optical-to-electrical conversion section 31, the band demultiplexing section 32c, the band down conversion section 33c, the signal multiplexing section 34c, the first error detecting section 351, the second error detecting section 352, and the band control section 36. In FIG. 9, the components that function in a similar manner to their counterparts in the first embodiment are denoted by like numerals, with the descriptions thereof omitted.

A transmission range of the actual optical transmission system may vary. At the same time, as shown in the equation 2, a local minimum frequency of the frequency response, which is caused by chromatic dispersion, depends on a transmission range. Also, a value of chromatic dispersion varies with a wavelength. Thus, in order to handle various transmission ranges and various wavelengths of a laser by a configuration of one type of optical transmission system, a location of a signal band should be arbitrarily set in accordance with a frequency response of a transmission path. In the second embodiment, an optical transmission system capable of arbitrarily setting a location of a signal band in accordance with a frequency response of an optical transmission path is provided.

Next, with reference to FIG. 9, a function of each component of the present embodiment will be described. In FIG. 9, a flow of a signal is shown as a solid line, and a flow of control is shown as a dashed dotted line. The above control flow may be transferred via the optical fiber 1, or may be transferred via another communication medium.

The signal splitting section 11c splits a data signal into two bands based on a split ratio specified by the band control section 36. Other functions of the signal splitting section 11c are identical to the functions of the signal splitting section 11 of the first embodiment.

The band up conversion section 12c up-converts the second baseband signal to a center frequency $f_0$ specified by the band control section 36 to obtain a passband signal. Other functions of the band up conversion section 12c are identical to the functions of the band up conversion section 12 of the first embodiment.

The band demultiplexing section 32c demultiplexes the signal to two bands specified by the band control section 36. Other functions of the band demultiplexing section 32c are identical to the functions of the band demultiplexing section 32 of the first embodiment.

The band down conversion section 33c down-converts the passband signal to a center frequency $f_0$ specified by the band control section 36 to obtain a second baseband signal. Other functions of the band down conversion section 33c are identical to the functions of the band down conversion section 33 of the first embodiment.

The signal multiplexing section 34c multiplexes the first and second baseband signals based on a split ratio specified by the band control section 36. Other functions of the signal multiplexing section 34 care identical to the function of the signal multiplexing section 34 of the first embodiment.

The first error detecting section 351 detects an error rate of the first baseband signal output from the band demultiplexing section 32.

The second error detecting section 352 detects an error rate of the second baseband signal output from the band down conversion section 33.

The band control section 36 determines a split ratio of the first baseband signal and the second baseband signal and a center frequency $f_0$ of the passband signal based on the error rate detection results in the first error detecting section 351 and the second error detecting section 352, and controls the signal splitting section 11c, the band up conversion section 12c, the band demultiplexing section 32c, the band down conversion section 33c, and the signal multiplexing section 34c based thereon.

Figure 10:
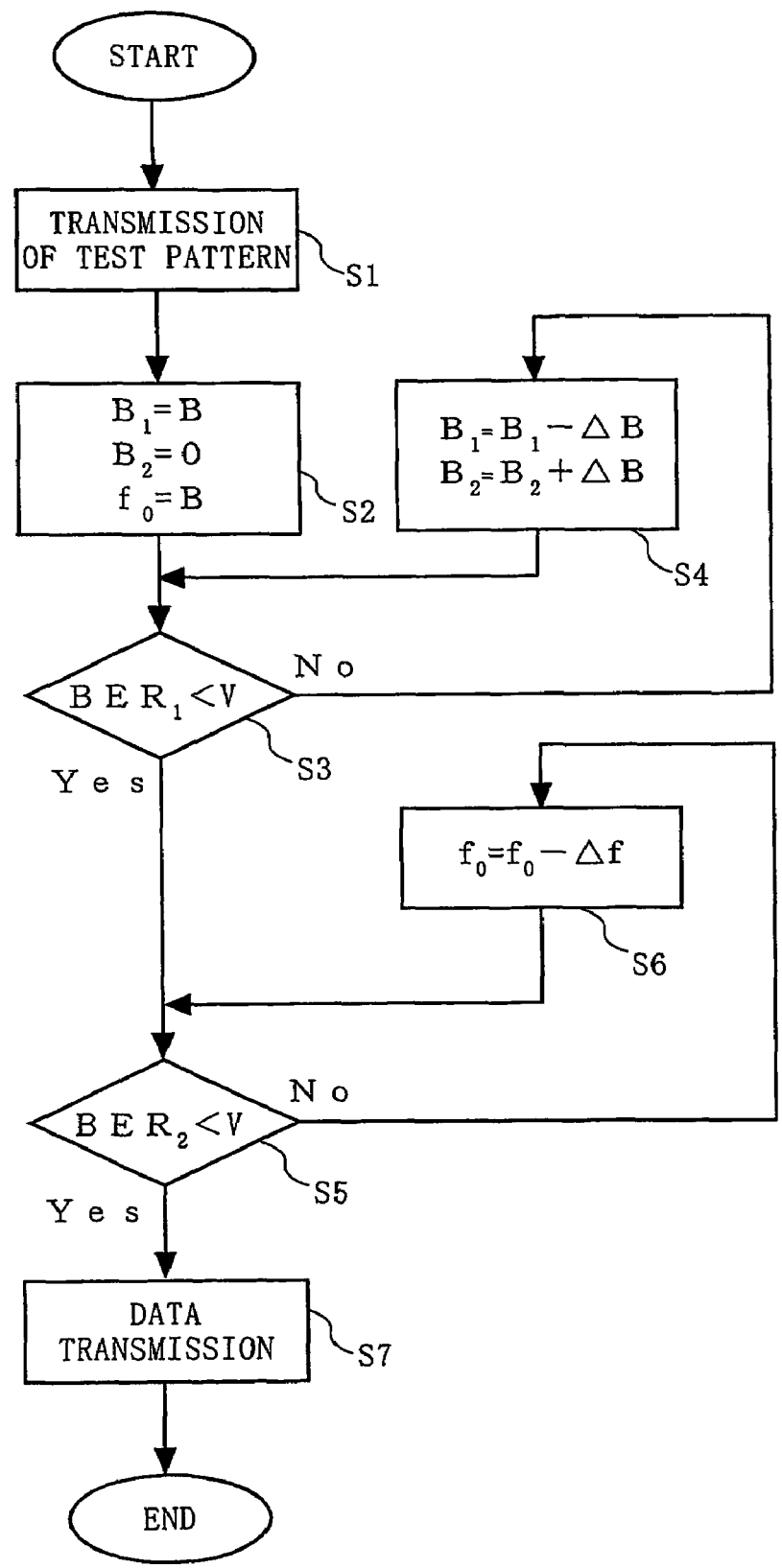
FIG. 10 is a flowchart showing an operation of a band control section 36.

FIG. 10 is a flowchart showing an operation of the band control section 36. Hereinafter, with reference to FIG. 10, a method for determining a frequency location of a signal of the second embodiment will be described.

First, before a control section (not shown) of the optical transmitting device 2a is caused to transmit an actual data signal, the band control section 36 causes the control section to transmit a test pattern for detecting an error rate (step S1).

Next, the band control section 36 sets an initial value of a bandwidth $B_1$ (upper frequency) of a first baseband signal to a bandwidth B (upper frequency) of a data signal, sets an initial value of a bandwidth $B_2$ (upper frequency) of a second baseband signal to zero, and sets an initial value of a center frequency $f_0$ of a passband signal to B (step S2).

Note that, in the following operation, the band control section 36 calculates a split ratio $B_1/B$ of the first baseband signal and a split ratio $B_2/B$ of the second baseband signal based on the bandwidth $B_1$ of the first baseband signal and the bandwidth $B_2$ of the second baseband signal, each of which is set as needed, and notifies the calculated split ratios to the signal splitting section 11c and the signal multiplexing section 34c. In response to this, the signal splitting section 11c splits a data signal into a first and second baseband signals based on the notified split ratios. Also, the signal multiplexing section 34c multiplexes the first and second baseband signals to obtain a data signal. Further, the band control section 36 notifies a center frequency $f_0$ of the passband signal, which is set as needed, to the band up conversion section 12c and the band down conversion section 33c. In response to this, the band up conversion section 12c up-converts the second baseband signal so as to have a center frequency $f_0$. Also, the band down conversion section 33c down-converts the signal whose center frequency is $f_0$, and outputs a second baseband signal. Further, the band control section 36 notifies a center frequency $f_0$ of the passband signal and a band width $B_2$ of the second baseband signal, each of which is set as needed, to the band demultiplexing section 32c. In response to this, the band demultiplexing section 32c demultiplexes a passband signal whose center frequency is $f_0$ and whose bandwidth is $2 \times B_2$ and a first baseband signal, and output the resultant signals.

Next, the band control section 36 determines whether or not the error rate $BER_1$, which is detected by the first error detecting section 351, of the first baseband signal is smaller than a reference value V (step S3). If the error rate $BER_1$ of the first baseband signal is not smaller than a reference value V (that is, if the quality of the first baseband signal is not maintained), the band control section 36 reduces the bandwidth $B_1$ of the first baseband signal by a predetermined amount $\Delta B$, increases the bandwidth $B_2$ of the second baseband signal by a predetermined amount $\Delta B$ (step S4), and goes back to step S3. If the error rate $BER_1$ of the first baseband signal becomes smaller than a reference value V (that is, the quality of the first baseband signal is maintained) in the course of repeating the above process, i, the band control section 36 fixes the bandwidths $B_1$ and $B_2$ of the respective first and second baseband signals, which are set at step S4, and proceeds to step S5.

At step S5, the band control section 36 determines whether or not the error rate $BER_2$, which is detected by the second error detecting section 352, of the second baseband signal is smaller than a reference value V. If the error rate $BER_2$ of the second baseband signal is not smaller than a reference value V (that is, if the quality of the second baseband signal is not maintained), the band control section 36 increases the center frequency $f_0$ of the passband signal by a predetermined amount $\Delta f$ (step S6), and goes back to step S5. If the error rate $BER_2$ of the second baseband signal becomes smaller than a reference value V (that is, the quality of the second baseband signal is maintained) in the course of repeating the above process, the band control section 36 fixes the center frequency $f_0$, which is set at step S6, of the passband signal, causes the optical transmitting device 2a to stop transmitting the test pattern, starts transmission of a data signal (step S7) by causing the optical transmitting device 2a to transmit the data signal, and ends the process.

As such, based on the second embodiment, the optical transmission system monitors an error rate of the optically-transmitted data signal, and optimally sets a band to be used so as to prevent an error from occurring. Thus, it is possible to provide an optical transmission system capable of adapting to an optical transmission path having various frequency responses. That is, in addition to the advantage of the first embodiment, the optical transmission system according to the second embodiment has an advantage that one type of system configuration can handle various transmission ranges and various wavelengths of a laser.

Note that $\Delta B$ and $\Delta f$ may be appropriately set in view of allowable time required for determining a frequency location and accuracy of the frequency location.

Note that, in the present embodiment, one example in which a test pattern is used for detecting an error rate has been described. However, an error correcting code may be added to the first and second baseband signals, thereby monitoring an error rate by detecting the error correcting code by the first and second error detecting sections.

In the case where there is a shortage of a bandwidth by only splitting a data signal into two, it is possible to solve this problem by splitting the data signal into three or more by performing the same process as shown in FIGS. 7 and 8.

Third Embodiment

Figure 11:
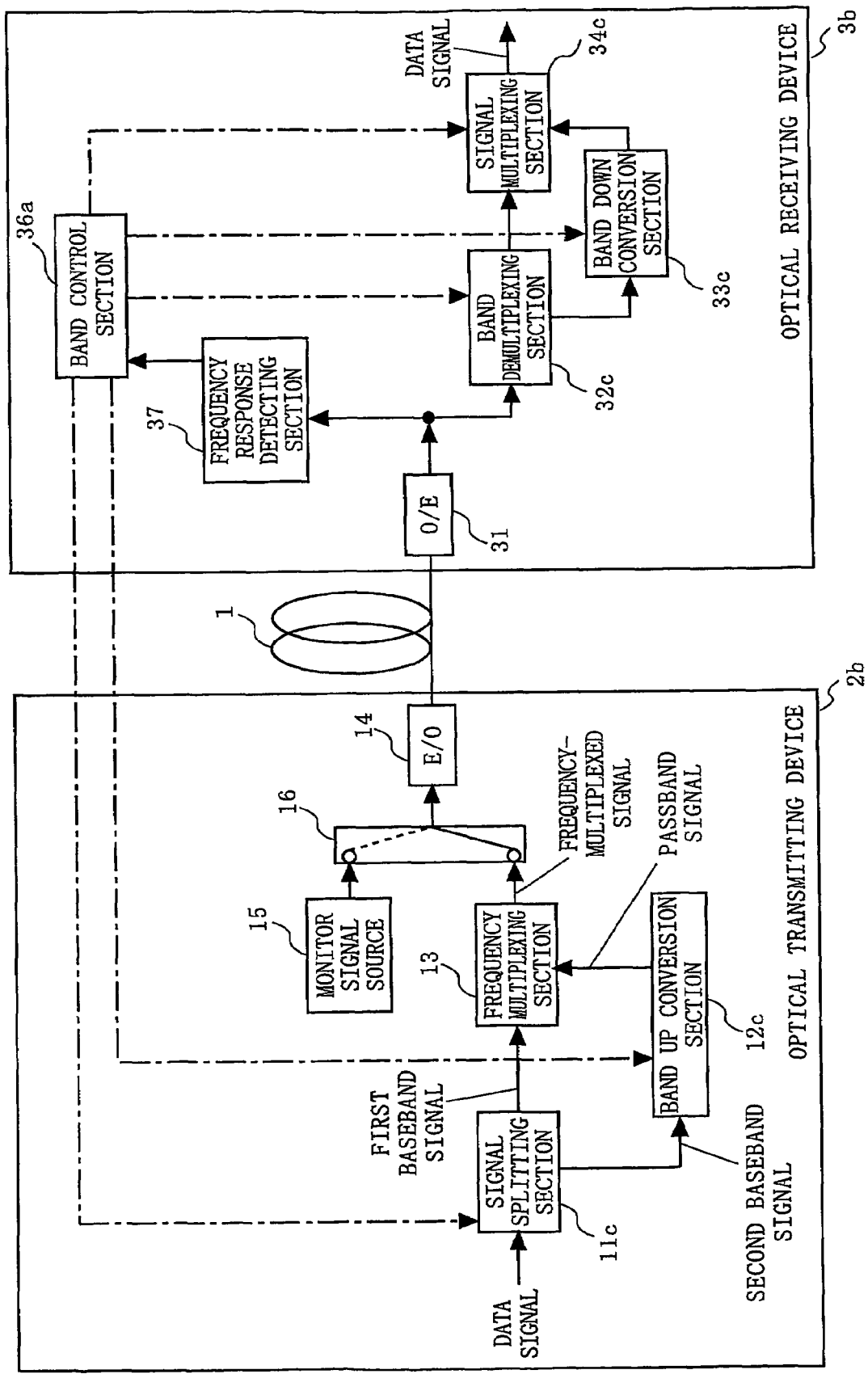
FIG. 11 is a block diagram showing a configuration of a split-band optical transmission system according to a third embodiment of the present embodiment.

FIG. 11 is a block diagram showing a configuration of a split-band optical transmission system according to a third embodiment of the present invention. In FIG. 11, the split-band optical transmission system includes the signal splitting section 11c, the band up conversion section 12c, the frequency multiplexing section 13, a monitor signal source 15, a switch 16, the electrical-to-optical conversion section 14, the optical fiber 1, the optical-to-electrical conversion 31, the band demultiplexing section 32c, the band down conversion section 33c, the signal multiplexing section 34c, a frequency response detecting section 37, and a band control section 36a.

An optical transmitting device 2b is composed of the signal splitting section 11c, the band up conversion section 12c, the frequency multiplexing section 13, the monitor signal source 15, the switch 16, and the electrical-to-optical conversion section 14.

An optical receiving device 3b is composed of the optical-to-electrical conversion section 31, the band demultiplexing section 32c, the band down conversion section 33c, the signal multiplexing section 34c, the frequency response detecting section 37, and the band control section 36a.

In FIG. 11, the components that function in similar manners to their counterparts in the first and second embodiments are denoted by like numerals, with the descriptions thereof omitted.

As is the case with the second embodiment, the third embodiment is designed to enable arbitrary setting of a signal band in accordance with a frequency response of an optical transmission path.

Next, with reference to FIG. 11, a function of each component of the present embodiment will be described. In FIG. 11, a flow of a signal is shown as a solid line, and a flow of control is shown as a dashed dotted line. The above control flow may be transferred via the optical fiber 1, or may be transferred via another communication medium.

The monitor signal source 15 outputs a sine wave signal. A frequency of the sine wave signal output by the monitor signal source 15 may be arbitrarily set.

A frequency-multiplexed signal output from the frequency multiplexing section 13 and the sine wave signal output from the monitor signal source 15 are input to the switch 6. The switch 16 selects between the above two signals, and outputs the selected signal to the electrical-to-optical conversion section 14.

The frequency response detecting section 37 detects a level of the inputted sine wave signal, thereby detecting a frequency response of the optical transmission path.

Based on the frequency response detected by the frequency response detecting section 37, the band control section 36a determines a bandwidth $B_1$ of the first baseband signal, a bandwidth $B_2$ of the second baseband signal, a split ratio used for splitting a data signal into the first baseband signal and the second baseband signal, and a center frequency $f_0$ of the passband signal. Based thereon, the band control section 36a controls the signal splitting section 11c, the band up conversion section 12c, the band demultiplexing section 32c, the band down conversion section 33c, and the signal multiplexing section 34c.

Next, a method for determining a frequency location of a signal of the present embodiment will be described. First, the optical transmitting device 2b causes the switch 16 to select a sine wave signal output from the monitor signal source 15. Next, the monitor signal source 15 outputs a sine wave signal so as to sweep within the band used for transmission.

On the receiving end, the frequency response detecting section 37 extracts a monitor signal from the signal output from the optical-to-electrical conversion section 31, and detects, on a frequency basis, a level of the sine wave signal whose frequency is swept. As a result, the frequency response detecting section 37 detects a frequency response of the optical transmission path. Next, based on the detected frequency response, the band control section 36a obtains local minimum frequencies $f_{m1}$ and $f_{m2}$ at which a signal level of the sine wave signal becomes lowest. As is the case with the first embodiment, based on the obtained local minimum frequencies $f_{m1}$ and $f_{m2}$, the band control section 36a obtains a bandwidth $B_1$ ($<f_{m1}$) of the first baseband signal, a center frequency $f_0$ ($f_{m1}<f_0<f_{m2}$) of the passband signal, and a bandwidth $B_2$ ($f_{m1}<f_0-B_2$, $f_0+B_2<f_{m2}$) of the second baseband signal. As is the case with the second embodiment, the band control section 36a controls the signal splitting section 11c, the band up conversion section 12c, the band demultiplexing section 32c, the band down conversion section 33c, and the signal multiplexing section 34c in accordance with the obtained bandwidth $B_1$ of the first baseband signal, the bandwidth $B_2$ of the second baseband signal, a split ratio for splitting a data signal into the first baseband signal and the second baseband signal, and the center frequency $f_0$ of the passband signal.

As such, based on the third embodiment, the optical transmission system detects a frequency response of an optical transmission path, and sets a frequency location of a signal based thereon, thereby capable of adapting to an optical transmission path having various frequency responses. That is, in addition to the advantage of the first embodiment, the optical transmission system according to the third embodiment has an advantage that one type of system configuration can handle various transmission ranges and various wavelengths of a laser.

Fourth Embodiment

Figure 12:
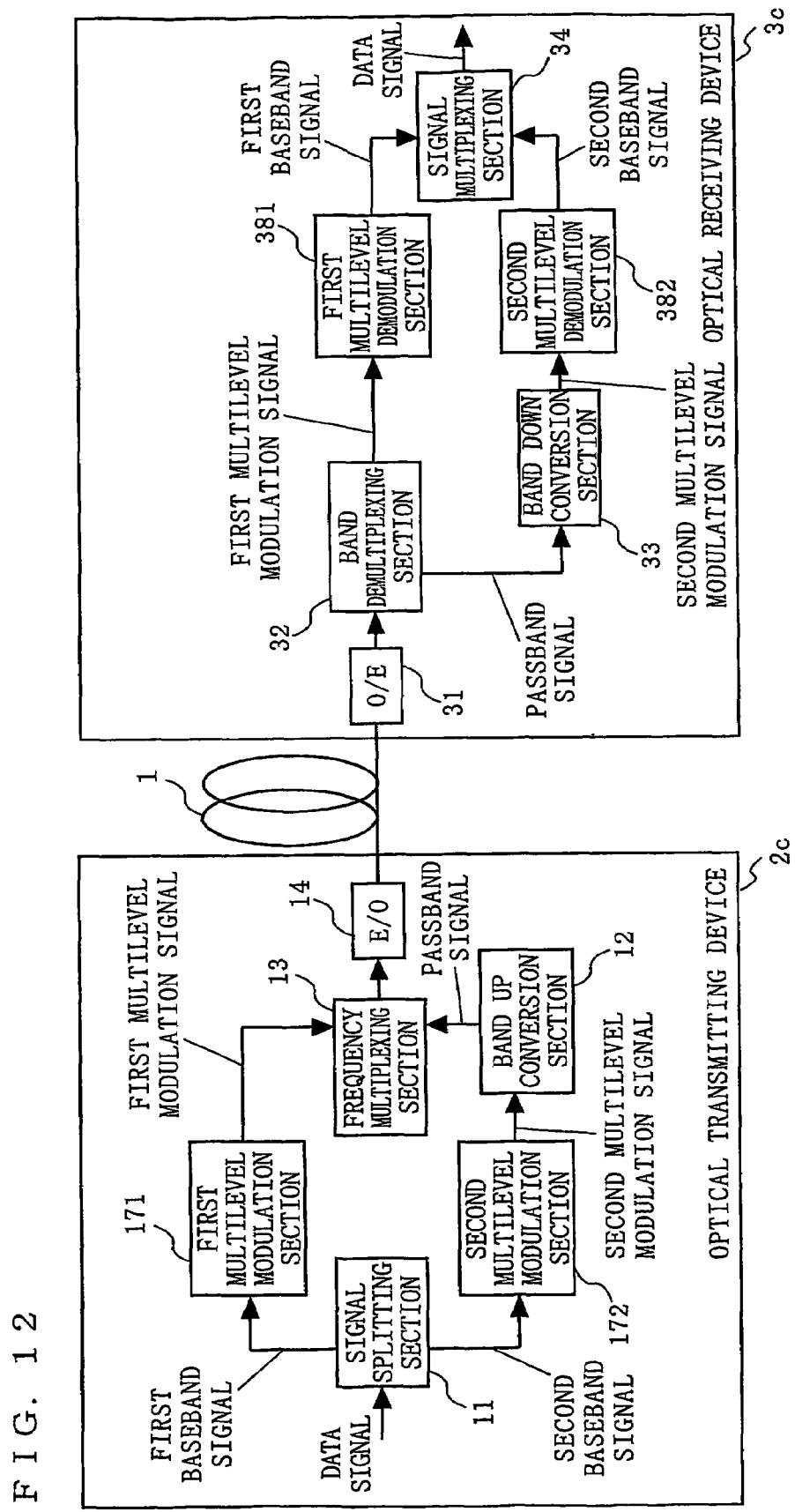
FIG. 12 is a block diagram showing a configuration of a split-band optical transmission system according to a fourth embodiment of the present embodiment.

FIG. 12 is a block diagram showing a configuration of a split-band optical transmission system according to a fourth embodiment of the present invention. In FIG. 12, the split-band optical transmission system includes the signal splitting section 11, a first multilevel modulation section 171, a second multilevel modulation section 172, the band up conversion section 12, the frequency multiplexing section 13, the electrical-to-optical conversion section 14, the optical fiber 1, the optical-to-electrical conversion section 31, the band demultiplexing section 32, the band down conversion section 33, a first multilevel demodulation section 381, a second multilevel demodulation section 382, and the signal multiplexing section 34. An optical transmitting device 2c is composed of the signal splitting section 11, the first multilevel modulation section 171, the second multilevel modulation section 172, the band up conversion section 12, the frequency multiplexing section 13, and the electrical-to-optical conversion section 14. An optical receiving device 3c is composed of the optical-to-electrical conversion section 31, the band demultiplexing section 32, the band down conversion section 33, the first multilevel demodulation section 381, the second multilevel demodulation section 382, and the signal multiplexing section 34. In FIG. 12, the components that function in similar manners to their counterparts in the first embodiment are denoted by like numerals, with the descriptions thereof omitted.

Next, with reference to FIG. 12, a function of each component will be described.

The first multilevel modulation section 171 performs multilevel modulation for the inputted first baseband signal, and outputs a first multilevel modulation signal. The second multilevel modulation section 172 performs multilevel modulation for the inputted second baseband signal, and outputs a second multilevel modulation signal. The first multilevel demodulation section 381 demodulates the first multilevel modulation signal. The second multilevel demodulation section 382 demodulates the second multilevel modulation signal.

An operation in the fourth embodiment, which is basically identical to the first embodiment, differs from the first embodiment in that frequency multiplexing is performed for the multilevel-modulated first and second baseband signal, thereby transmitting the resultant signal.

Here, in the present embodiment, a method for determining a number M of multilevel (M-ary) modulation (hereinafter, a number M is referred to as an M-ary number) will be described. First, assume that a necessary signal level can be adequately maintained in a frequency band $B_{t1}$, which is smaller than the first local minimum frequency $f_{m1}$ of the frequency response of the optical transmission path, and assume that a necessary signal level can be adequately maintained in a frequency band $B_{t2}$ between the first and second local minimum frequency points. Next, a transmission rate $B''_1$ of the first baseband signal and a transmission rate $B''_2$ of the second baseband signal are set so as to satisfy equations 4 and 5 on the assumption that a transmission rate of the data signal is B.

$$B''_1 + B''_2 = B \qquad \text{[equation 4]}$$

$$\frac{B''_1}{B''_2} \cong \frac{B_{t1}}{B_{t2}/2} \qquad \text{[equation 5]}$$

Here, $B_{t1}$ represents a bandwidth in the case where the first baseband signal is transmitted as a binary signal, and $B_{t2}$ represents a bandwidth in the case where the second baseband signal is transmitted as a binary signal.

Next, an M-ary number of the first multilevel modulation section 171 is determined as follows.

First, a natural number k satisfying the following equation 6 is obtained.

$$2^k \leq \frac{B''_1}{B_{t1}} < 2^{k+1} \qquad \text{[equation 6]}$$

Next, M satisfying the following equation 7 is obtained.

$$M = 2^{k+1} \qquad \text{[equation 7]}$$

Similarly, an M-ary number of the second multilevel modulation section 172 is obtained. Specifically, it can be obtained only by replacing $B''_1/B_{t1}$ in the above equation 6 with $B''_2/B_{t2}$.

As such, a predetermined M-ary number of the first multilevel modulation section 171 and a predetermined M-ary number of the second multilevel modulation section 172 are determined in accordance with the data rates required by the first and second baseband signals and the frequency band ratios assigned to the first and second baseband signals.

Conventional baseband transmission requires a bandwidth equal to a bit rate. Also, passband transmission includes an upper side band and a lower side band, thereby requiring a bandwidth twice as wide as a bit rate. On the other hand, in the fourth embodiment, it is possible to transmit the same amount of information over a narrower frequency band by performing multilevel modulation. Thus, it is possible to provide an optical transmission system capable of handling a case in which a high frequency band is not available for transmission due to severe distortion of a frequency response of an optical transmission path.

Note that, in the case where there still is a shortage of a bandwidth, the number of split of a data signal may be increased, thereby setting bands in similar manners. Specifically, the optical transmitting device includes: a signal splitting section for splitting information included in a data signal into N (N is equal to or greater than three) pieces of information in accordance with a predetermined split ratio corresponding to a frequency response of the optical transmission path and outputting the resultant N pieces of information as first to $N_{th}$ baseband signals; first to $N_{th}$ multilevel modulation sections for performing multilevel modulation for the respective first to $N_{th}$ baseband signals output from the signal splitting section in accordance with predetermined M-ary numbers determined based on the frequency response of the optical transmission path; first to $N-1_{th}$ band up conversion sections for converting the second to $N_{th}$ multilevel modulation signals output from the respective second to $N_{th}$ multilevel modulation sections to first to $N-1_{th}$ passband signals having different predetermined center frequencies; and a frequency multiplexing section for performing frequency multiplexing for the first multilevel modulation signal and the first to $N-1_{th}$ passband signals.

The optical receiving device includes: a band demultiplexing section for demultiplexing a frequency-multiplexed signal output from the optical-to-electrical conversion section to obtain the first multilevel modulation signal and the first to $N-1_{th}$ passband signals; a first multilevel demodulation section for demodulating the first multilevel modulation signal demultiplexed by the band demultiplexing section and outputting the first baseband signal; first to $N-1_{th}$ band down conversion sections for outputting the second to $N_{th}$ multilevel modulation signals, respectively, by performing frequency conversion for the first to $N-1_{th}$ passband signals demultiplexed by the band demultiplexing section; second to $N_{th}$ multilevel demodulation sections for converting the respective second to $N_{th}$ multilevel modulation signals output from the band down conversion sections to the second to $N_{th}$ baseband signals by demodulation; and a signal multiplexing section for recovering the data signal by multiplexing the first baseband signal output from the first multilevel demodulation section and the second to $N_{th}$ baseband signals output from the respective second to $N_{th}$ multilevel demodulation sections. In this case, in order to locate a first baseband signal and first to $N-1_{th}$ passband signals in the respective frequency bands away from a local minimum in the frequency response of the optical transmission path, the optical transmitting device may split the information into N pieces of information in the signal splitting section, and perform up-conversion in the band up conversion section.

Note that a passband signal may be a signal for which single side-band modulation is performed.

Fifth Embodiment

Figure 13:
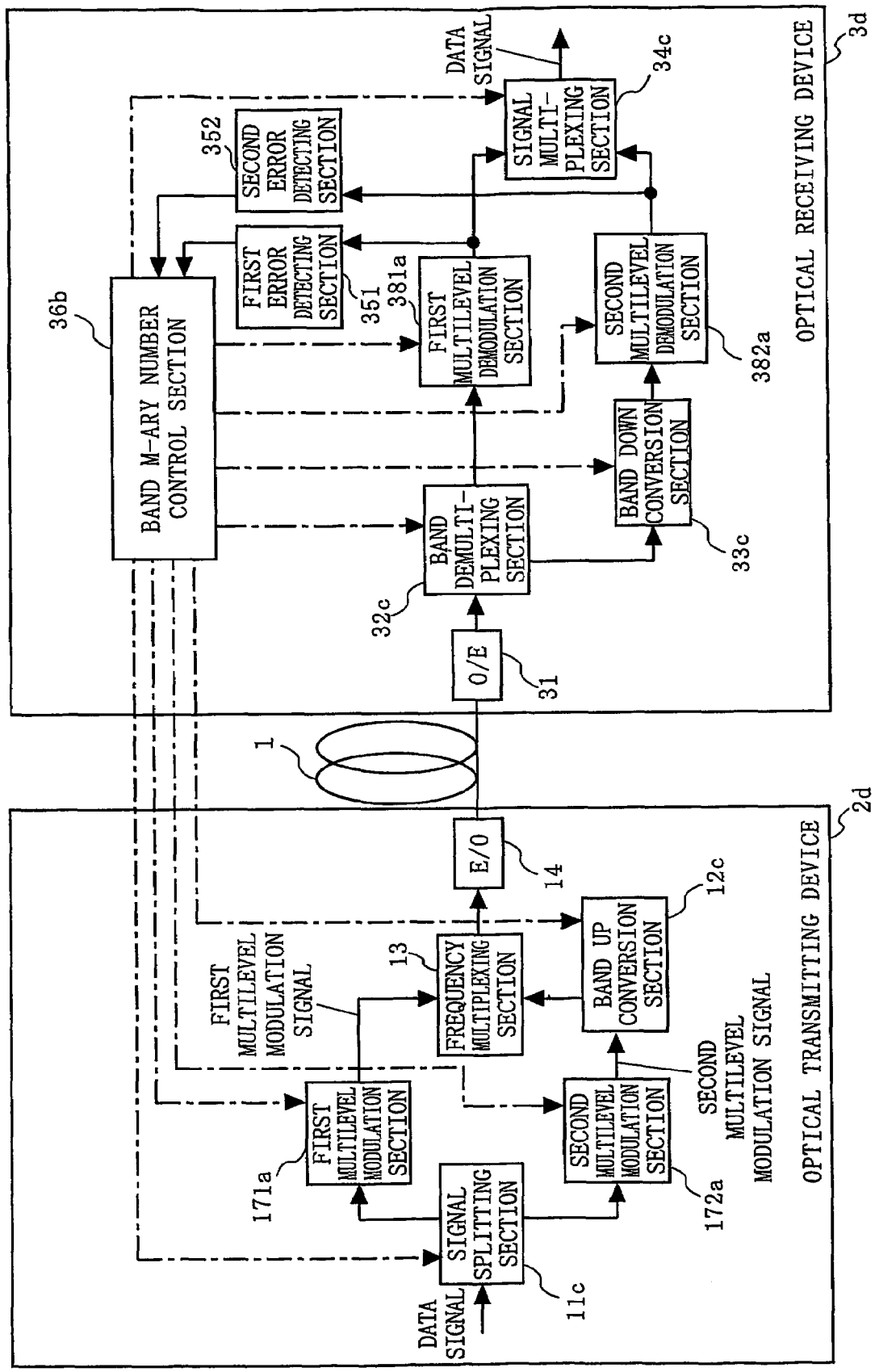
FIG. 13 is a block diagram showing a configuration of a split-band optical transmission system according to a fifth embodiment of the present embodiment.

FIG. 13 is a block diagram showing a configuration of a split-band optical transmission system according to a fifth embodiment of the present invention. In FIG. 13, the split-band optical transmission system includes the signal splitting section 11c, a first multilevel modulation section 171a, a second multilevel modulation section 172a, the band up conversion section 12c, the frequency multiplexing section 13, the electrical-to-optical conversion section 14, the optical fiber 1, the optical-to-electrical conversion section 31, the band demultiplexing section 32c, the band down conversion section 33c, a first multilevel demodulation section 381a, a second multilevel demodulation section 382a, the signal multiplexing section 34c, the first error detecting section 351, the second error detecting section 352, and a band M-ary number control section 36b. In FIG. 13, the components that function in similar manners to their counterparts in the first and second embodiments are denoted by like numerals, with the descriptions thereof omitted.

The first multilevel modulation section 171a performs multilevel modulation for the first baseband signal output from the signal splitting section 11c based on an M-ary number designated by the band M-ary number control section 36b, and outputs a first multilevel modulation signal. Other functions of the first multilevel modulation section 171a are identical to the function of the first multilevel modulation section 171 of the fourth embodiment.

The second multilevel modulation section 172a performs multilevel modulation for the second baseband signal output from the signal splitting section 11c based on an M-ary number designated by the band M-ary number control section 36b, and outputs a second multilevel modulation signal. Other functions of the second multilevel modulation section 172a are identical to the function of the second multilevel modulation section 172 of the fourth embodiment.

The first multilevel demodulation section 381a performs multilevel demodulation for the first multilevel modulation signal output from the band demultiplexing section 32c based on an M-ary number designated by the band M-ary number control section 36b, and outputs a first baseband signal. Other functions of the first multilevel demodulation section 381a are identical to the function of the first multilevel demodulation section 381 of the fourth embodiment.

The second multilevel demodulation section 382a performs multilevel demodulation for the second multilevel modulation signal output from the band down conversion section 33c based on an M-ary number designated by the band M-ary number control section 36b, and outputs a second baseband signal. Other functions of the second multilevel demodulation section 382a are identical to the function of the second multilevel demodulation section 382 of the fourth embodiment.

Figure 14:
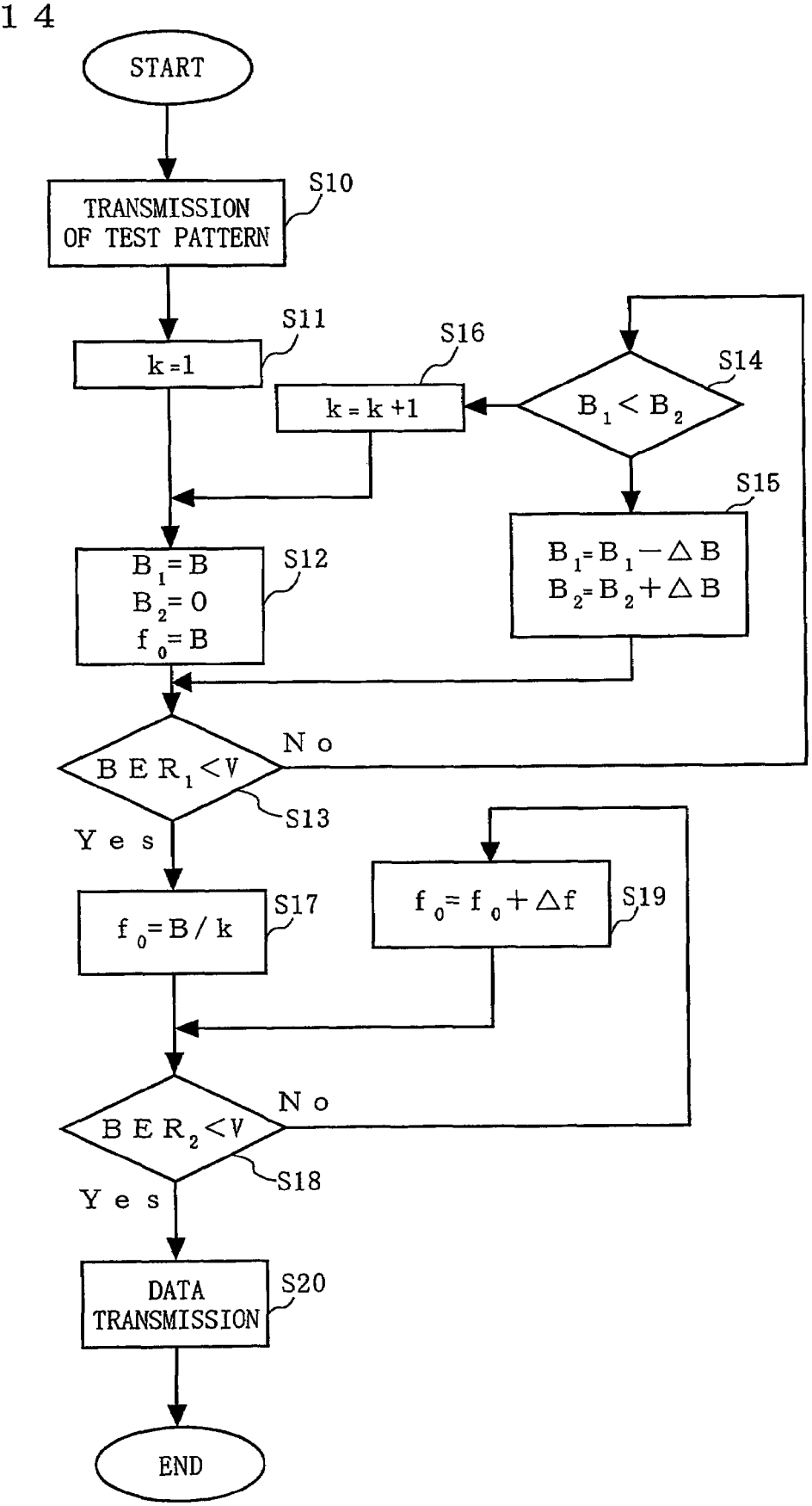
FIG. 14 is a flowchart showing an operation of a band M-ary number control section 36b.

FIG. 14 is a flowchart showing an operation of the band M-ary number control section 36b. Hereinafter, with reference to FIG. 14, a method for determining a frequency location of a signal and a method for determining an M-ary number in the fifth embodiment will be described.

First, before actual data is transmitted, the band M-ary number control section 36b causes an optical transmitting device 2d to transmit a test pattern for detecting an error rate (step S10).

Next, the band M-ary number control section 36b sets an initial value of an M-ary number to 2 (in the equation 7, k=0) (step S11). Next, the band M-ary number control section 36b sets an initial value of a bandwidth $B_1$ of the first baseband signal to a bandwidth B of the data signal, sets an initial value of a bandwidth $B_2$ of the second baseband signal to 0, and sets an initial value of a center frequency $f_0$ of the passband signal to B (step S12).

Note that, in the following operation, the band M-ary number control section 36b calculates a split ratio $B_1/B$ of the first baseband signal and a split ratio $B_2/B$ of the second baseband signal based on the bandwidth $B_1$ of the first baseband signal and the bandwidth $B_2$ of the second baseband signal, which are set as needed, and notifies the calculated split ratios to the signal splitting section 11c and the signal multiplexing section 34c. In response to this, the signal splitting section 11c splits the data signal into the first and second baseband signals in accordance with the notified split ratios. Also, the band multiplexing section 34c multiplexes the first and second baseband signals to obtain a data signal. Further, the band M-ary number control section 36b notifies the center $f_0$ of the passband signal, which is set as needed, to the band up conversion section 12c and the band down conversion section 33c. In response to this, the band up conversion section 12c up-converts the second multilevel modulation signal so as to have a center frequency $f_0$. Also, the band down conversion section 33c down-converts a signal whose center frequency is $f_0$, and outputs a second multilevel modulation signal. Further, the band M-ary number control section 36b notifies the center frequency $f_0$ of the passband signal and the bandwidth $B_2$ of the second baseband signal, which are set as needed, to the band demultiplexing section 32c. In response to this, the band demultiplexing section 32c demultiplexes a passband signal whose center frequency is $f_0$ and whose bandwidth is $2 \times B_2$ and a first baseband signal, and outputs the resultant signals.

Next, the band M-ary number control section 36b determines whether or not the error rate $BER_1$, which is detected by the first error detecting section 351, of the first baseband signal is smaller than a reference value V (step S13). If the error rate $BER_1$ of the first baseband signal is not smaller than a reference value V (that is, if the quality of the first baseband signal is not maintained), the band M-ary number control section 36b determines whether or not the bandwidth $B_1$ of the first baseband signal is smaller than the bandwidth $B_2$ of the second baseband signal (step S14). If the bandwidth $B_1$ of the first baseband signal is not smaller than the bandwidth $B_2$ of the second baseband signal, the band M-ary number control section 36b reduces the bandwidth $B_1$ of the first baseband signal by a predetermined amount $\Delta B$, increases the bandwidth $B_2$ of the second baseband signal by a predetermined amount $\Delta B$ (step S15), and goes back to step S13. On the other hand, at step S14, if it is determined that the bandwidth $B_1$ of the first baseband signal is smaller than the bandwidth $B_2$ of the second baseband signal, the band M-ary number control section 36b increments k by 1 so as to double the M-ary number (step S16), resets the bandwidth $B_1$ of the first baseband signal, the bandwidth $B_2$ of the second baseband signal, and the center frequency $f_0$ of the passband signal to initial values (step S12), and goes back to step S13.

At step S13, if it is determined that the error rate $BER_1$ of the first baseband signal is smaller than a reference value V, the band M-ary number control section 36b sets an initial value of the passband signal to B/(k+1) (step S17). Next, the band M-ary number control section 36b determines whether or not the $BER_2$ of the second baseband signal is smaller than a reference value V (step S18). If the error rate of the second baseband signal is not smaller than a reference value V, the band M-ary number control section 36b increases the center frequency $f_0$ of the passband signal by a predetermined amount $\Delta f$ (step S19), and goes back to step S18. After the above-described process is repeated, if the error rate $BER_2$ of the second baseband signal is smaller than a reference value V, the band M-ary number control section 36b fixes the center frequency $f_0$ of the passband signal, starts transmission of a data signal (step S20), and ends the process.

As such, based on the fifth embodiment, the optical transmission system monitors an error rate, and optimally sets a band and an M-ary number to be used so as to prevent an error from occurring. Thus, it is possible to provide an optical transmission system capable of adapting to an optical transmission path having various frequency responses. That is, in addition to the advantage of the first embodiment, the optical transmission system according to the fifth embodiment has an advantage that one type of system configuration can handle various transmission ranges and various wavelengths of a laser.

Note that $\Delta B$ and $\Delta f$ may be appropriately set in view of allowable time required for determining a frequency location and accuracy of the frequency location.

Sixth Embodiment

Figure 15:
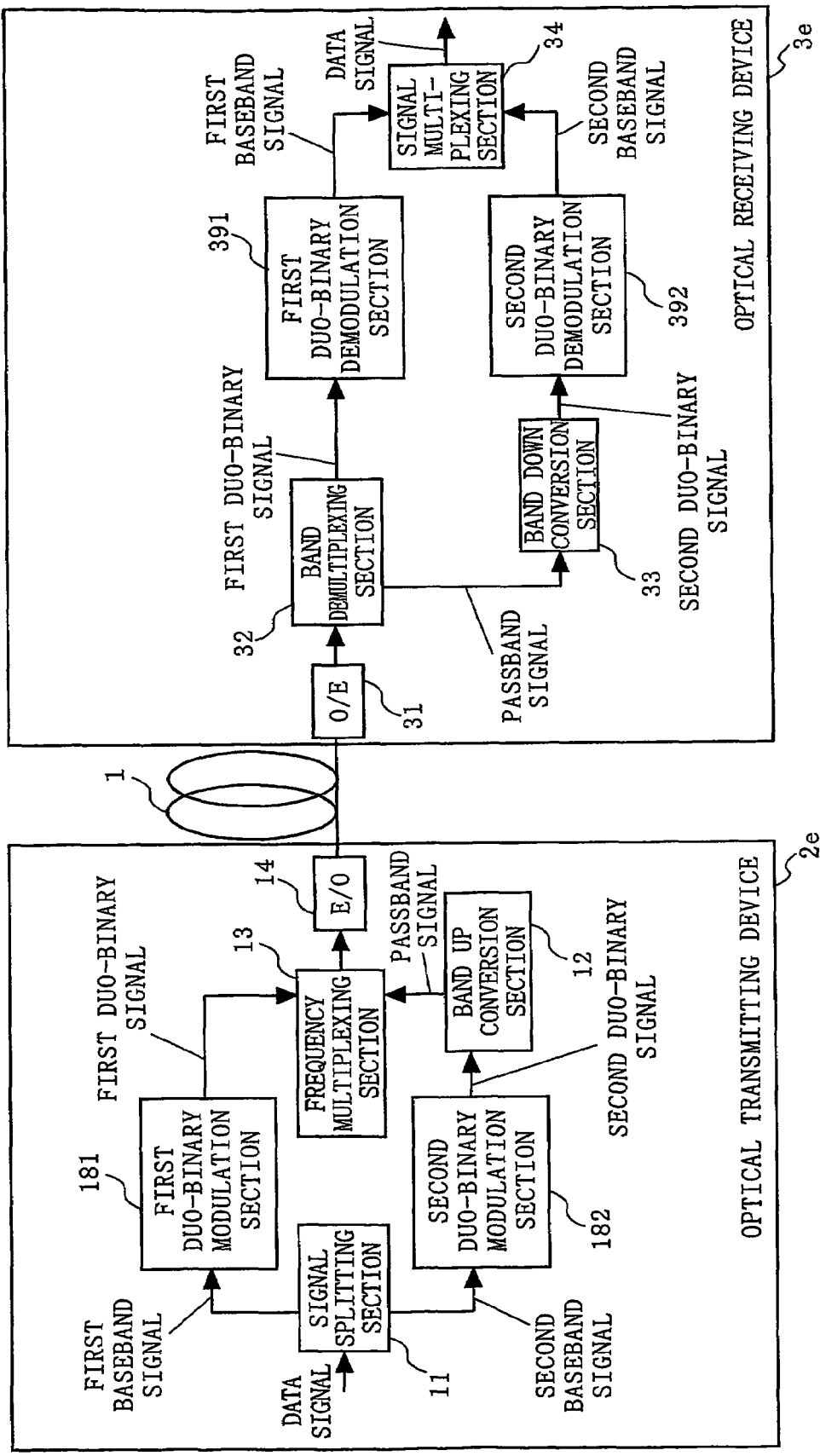
FIG. 15 is a block diagram showing a configuration of a split-band optical transmission system according to a sixth embodiment of the present embodiment.

FIG. 15 is a block diagram showing a configuration of a split-band optical transmission system according to a sixth embodiment of the present invention. In FIG. 15, the split-band optical transmission system includes the signal splitting section 11, a first duo-binary modulation section 181, a second duo-binary modulation section 182, the band up conversion section 12, the frequency multiplexing section 13, the electrical-to-optical conversion section 14, the optical fiber 1, the optical-to-electrical conversion section 31, the band demultiplexing section 32, the band down conversion section 33, a first duo-binary demodulation section 391, a second duo-binary demodulation section 392, and the signal multiplexing section 34. An optical transmitting device 2e is composed of the signal splitting section 11, the first duo-binary modulation section 181, the second duo-binary modulation section 182, the band up conversion section 12, the frequency multiplexing section 13, and the electrical-to-optical conversion section 14. An optical receiving device is composed of the optical-to-electrical conversion section 31, the band demultiplexing section 32, the band down conversion section 33, the first duo-binary demodulation section 391, the second duo-binary demodulation section 392, and the signal multiplexing section 34. In FIG. 15, the components that function in a similar manner to their counterparts in the first embodiment are denoted by like numerals, with the descriptions thereof omitted.

The first duo-binary modulation section 181 performs duo-binary modulation for an inputted first baseband signal, and outputs a first duo-binary signal. The second duo-binary modulation section 182 performs duo-binary modulation for an inputted second baseband signal, and outputs a second duo-binary signal. The first duo-binary demodulation section 391 demodulates the first duo-binary signal. The second duo-binary demodulation section 392 demodulates the second duo-binary signal.

An operation in the sixth embodiment, which is basically identical to the first embodiment, differs from the first embodiment in that frequency multiplexing is performed for the duo-binary modulated first and second baseband signals, thereby transmitting the resultant signal. In conventional baseband transmission, an electrical signal requires a bandwidth equal to a bit rate, and passband transmission requires a bandwidth twice as wide as a bit rate. On the other hand, by performing duo-binary modulation, it is possible to transmit the same amount of information over a bandwidth half as wide as a bit rate in the baseband transmission, and transmit the same amount of information over a bandwidth equal to a bit rate in the passband transmission. Thus, it is possible to provide an optical transmission system capable of handling a case in which a high frequency band is not available for transmission due to severe distortion of a frequency response of an optical transmission path.

Also, in place of duo-binary modulation, single side-band modulation may be used as a transmission scheme for performing narrow-band transmission. In the single sideband modulation, a bandwidth of the passband signal is equal to a bandwidth of a bit rate, whereby it is possible to transmit the same amount of information over a bandwidth half as wide as a bandwidth of conventional passband transmission using double sideband.

As such, based on the present embodiment, as is the case with the fourth embodiment, it is possible to transmit the same amount of information over a narrower frequency band, thereby handling a case in which a frequency response of an optical transmission path is severely distorted.

Note that, in the case where there still is a shortage of a bandwidth, the number of split of a data signal may be increased, thereby setting bands in similar manners. Specifically, the optical transmitting device includes: a signal splitting section for splitting information included in a data signal into N (N is equal to or greater than three) pieces of information in accordance with a predetermined split ratio corresponding to a frequency response of the optical transmission path and outputting the resultant N pieces of information as first to $N_{th}$ baseband signals; first to $N_{th}$ duo-binary modulation sections for performing duo-binary modulation for the respective first to $N_{th}$ baseband signals output from the signal splitting section, and outputting first to $N_{th}$ duo-binary signals; first to $N-1_{th}$ band up conversion sections for converting the second to $N_{th}$ duo-binary signals output from the respective second to $N_{th}$ duo-binary modulation sections to first to $N-1_{th}$ passband signals each having a predetermined center frequency; and a frequency multiplexing section for performing frequency multiplexing for the first duo-binary signal and the first to $N-1_{th}$ passband signals.

The optical receiving device includes: a band demultiplexing section for demultiplexing a frequency-multiplexed signal output from the optical-to-electrical conversion section to obtain the first duo-binary signal and the first to $N-1_{th}$ passband signals; a first duo-binary demodulation section for demodulating the first duo-binary signal demultiplexed by the band demultiplexing section and outputting the first baseband signal; first to $N-1_{th}$ band down conversion sections for outputting the second to $N_{th}$ duo-binary signals, respectively, by performing frequency conversion for the first to $N-1_{th}$ passband signals demultiplexed by the band demultiplexing section; a second duo-binary demodulation section for converting the second to $N_{th}$ duo-binary signals output from the respective band down conversion sections to the second to $N_{th}$ baseband signals by demodulation; and a signal multiplexing section for recovering the data signal by multiplexing the first baseband signal output from the first duo-binary demodulation section and the second to $N_{th}$ baseband signals output from the respective second to $N_{th}$ duo-binary demodulation sections. In this case, in order to locate a first baseband signal and first to $N-1_{th}$ passband signals in the respective frequency bands away from a local minimum in the frequency response of the optical transmission path, the optical transmitting device may split the information into N pieces of information in the signal splitting section, and perform up-conversion in the band up conversion section.

Seventh Embodiment

Figure 16:
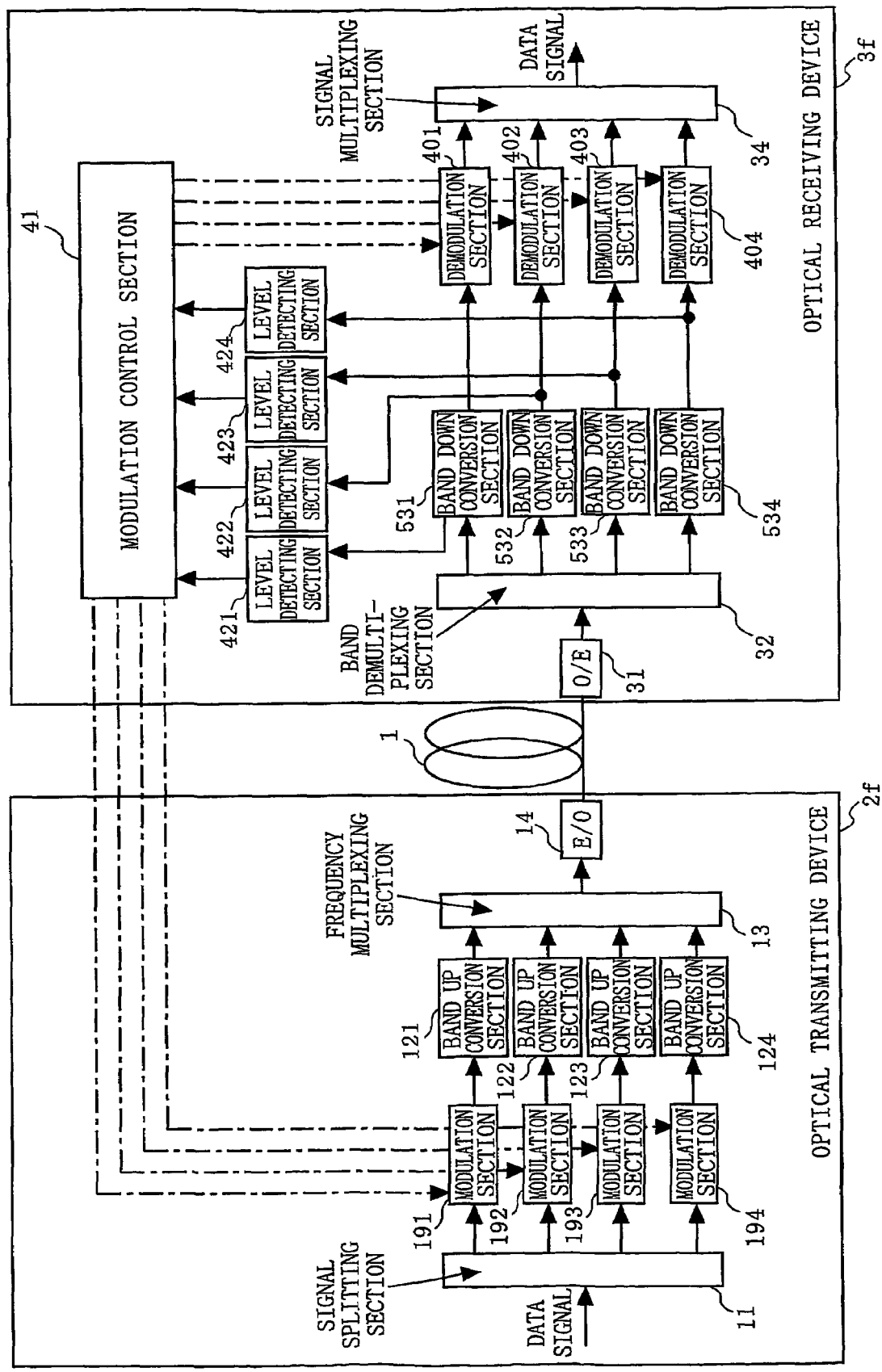
FIG. 16 is a block diagram showing a configuration of a split-band optical transmission system according to a seventh embodiment of the present embodiment.

FIG. 16 is a block diagram showing a configuration of a split-band optical transmission system according to a seventh embodiment of the present invention. In FIG. 16, the split-band optical transmission system includes the signal splitting section 11, modulation sections 191 to 194, band up conversion sections 121 to 124, the frequency multiplexing section 13, the electrical-to-optical conversion section 14, the optical fiber 1, the optical-to-electrical conversion section 31, the band demultiplexing section 32, a band down conversion section 531, level detecting sections 421 to 424, demodulation sections 401 to 404, the signal multiplexing section 34, and a modulation control section 41.

An optical transmitting device 2f is composed of the signal splitting section 11, the modulation sections 191 to 194, the band up conversion sections 121 to 124, the frequency multiplexing section 13, and the electrical-to-optical conversion section 14.

An optical receiving device 3f is composed of the optical-to-electrical conversion section 31, the band demultiplexing section 32, the band down conversion section 531, the level detecting sections 421 to 424, the demodulation sections 401 to 404, the signal multiplexing section 34, and the modulation control section 41.

In FIG. 16, the components that function in similar manners to their counterparts in the first embodiment are denoted by like numerals, with the descriptions thereof omitted. Note that, in FIG. 16, it is assumed that the number of demodulation sections, band up conversion sections, band down conversion sections, demodulation sections, and level detecting sections is four, but it is not limited thereto. The number thereof may be N (N is equal to or grater than two).

The signal splitting section 11 splits a data signal into first to fourth baseband signals in accordance with a predetermined split ratio, and outputs the resultant signals.

The modulation sections 191 to 194 are provided for the respective first to fourth baseband signals output from the signal splitting section 11, and each modulates the baseband signal in accordance with a predetermined modulation scheme designated by the modulation control section 41.

The band up conversion sections 121 to 124 are provided for the modulation sections 191 to 194, respectively. The band up conversion sections 121 to 124 up-convert the first to fourth modulation signals output from the respective modulation sections 191 to 194 to signals having different predetermined center frequencies, and output the resultant signals as first to fourth electrical signals, respectively.

The frequency multiplexing section 13 performs frequency multiplexing for the first to fourth electrical signals output from the respective band up conversion sections 121 to 124, and outputs a frequency-multiplexed signal.

The band demultiplexing section 32 demultiplexes the frequency-multiplexed signal output from the optical-to-electrical conversion section 31 to obtain first to fourth electrical signals, and outputs the resultant signals.

The band down conversion sections 531 to 534 are provided for a plurality of modulation signals, respectively. The band down conversion sections 531 to 534 down-convert the respective first to fourth electrical signals to a baseband, and output first to fourth modulation signals, respectively.

The demodulation sections 401 to 404 are provided for the band down conversion sections 531 to 534, respectively. The demodulation sections 401 to 404 demodulate the modulation signals output from the respective band down conversion sections 531 to 534 in accordance with a predetermined modulation scheme designated by the modulation control section 41, and output first to fourth baseband signals, respectively.

The signal multiplexing section 34 multiplexes the first to fourth baseband signals output from the respective demodulation sections 401 to 404, thereby recovering the data signal.

The level detecting sections 421 to 424 are provided for the band down conversion sections 531 to 534, respectively, for detecting a level of the respective first to fourth modulation signals.

The modulation control section 41 determines a modulation scheme of each modulation signal based on its signal level detected by any of the level detecting sections 421 to 424, and controls the modulation sections 191 to 194 and the demodulation sections 401 to 404 based on the determined modulation scheme.

Next, with reference to FIGS. 17A to 17C, a signal format used in the present embodiment will be described. FIG. 17A is an illustration showing a frequency response of the electrical-to-optical conversion section 14. FIG. 17B is an illustration showing a frequency response of the optical transmission path. FIG. 17C is an illustration showing exemplary frequency bands of signals output from the band up conversion sections 121 to 124 corresponding to the respective modulation sections 191 to 194.

In the present embodiment, assume that a frequency response (see FIG. 17A) of the electrical-to-optical conversion section 14 has a band which is adequately wider than a data signal to be transmitted. As described in the first embodiment, for example, as shown in FIG. 17B, a frequency response of an optical transmission path (including the electrical-to-optical conversion section 14, the optical fiber 1, and the optical-to-electrical conversion section 31) affected by chromatic dispersion is severely distorted at a predetermined frequency.

In the present embodiment, frequency bands of the signals output from the band up conversion sections 121 to 124 are fixed to predetermined values. The modulation control section 41 changes a modulation scheme in accordance with a frequency response of the optical transmission path in each modulation signal band. For example, as shown in FIG. 17C, due to a substantially flat frequency response in the band assigned to the modulation section 191, the modulation control section 41 causes the modulation section 191 to perform quaternary (M=4) modulation requiring a relatively high SNR. On the other hand, the modulation control section 41 causes the modulation sections 192 and 194 to perform a binary (M=2) modulation suitable for use at a low SNR since a frequency response is slightly distorted in the bands assigned to the modulation sections 192 and 194. A frequency response is severely distorted in the band assigned to the modulation section 193. Thus, the modulation control section 41 causes the modulation section 193 to stop sending a modulation signal without causing the modulation section 193 to perform modulation. Specifically, the modulation control section 41 causes a modulation section corresponding to any of the first to fourth modulation signals to stop sending the modulation signal if a signal level thereof, which is detected by any of the first to fourth level detecting sections, is equal to or smaller than a predetermined value. Note that the modulation control section 341 controls the signal splitting section 11 so as not to input information to the modulation section which stops sending a modulation signal.

As such, in accordance with a frequency response of an optical transmission path in a band assigned to each modulation section, the modulation control section 41 controls each modulation section so as to use a modulation scheme requiring a high SNR in the band where a frequency response is substantially flat, and to use a modulation scheme suitable for use at a low SNR in a band where a frequency response is slightly distorted, and so as not to perform transmission in the case where transmission is impossible even if a modulation scheme whose necessary SNR is the lowest is used. Note that detection of a frequency response is performed by detecting a level (average power) of each modulation signal by the level detecting sections 421 to 424.

Note that, in this embodiment, a case in which a band of a data signal is split into four has been described. However, the number of split of the data signal is not limited to four, and the number thereof may be arbitrary as long as it is equal to or greater than two.

As such, based on the present embodiment, even if there is a frequency at which a frequency response is severely distorted due to chromatic dispersion, etc., in a band corresponding to a transmission rate, it is possible to perform high-quality transmission of a data signal by changing a modulation scheme in accordance with a frequency response in each split band. Thus, it is possible to provide an optical transmission system capable of extending a transmission range without using a chromatic dispersion compensation optical device.

Eighth Embodiment

Figure 18:
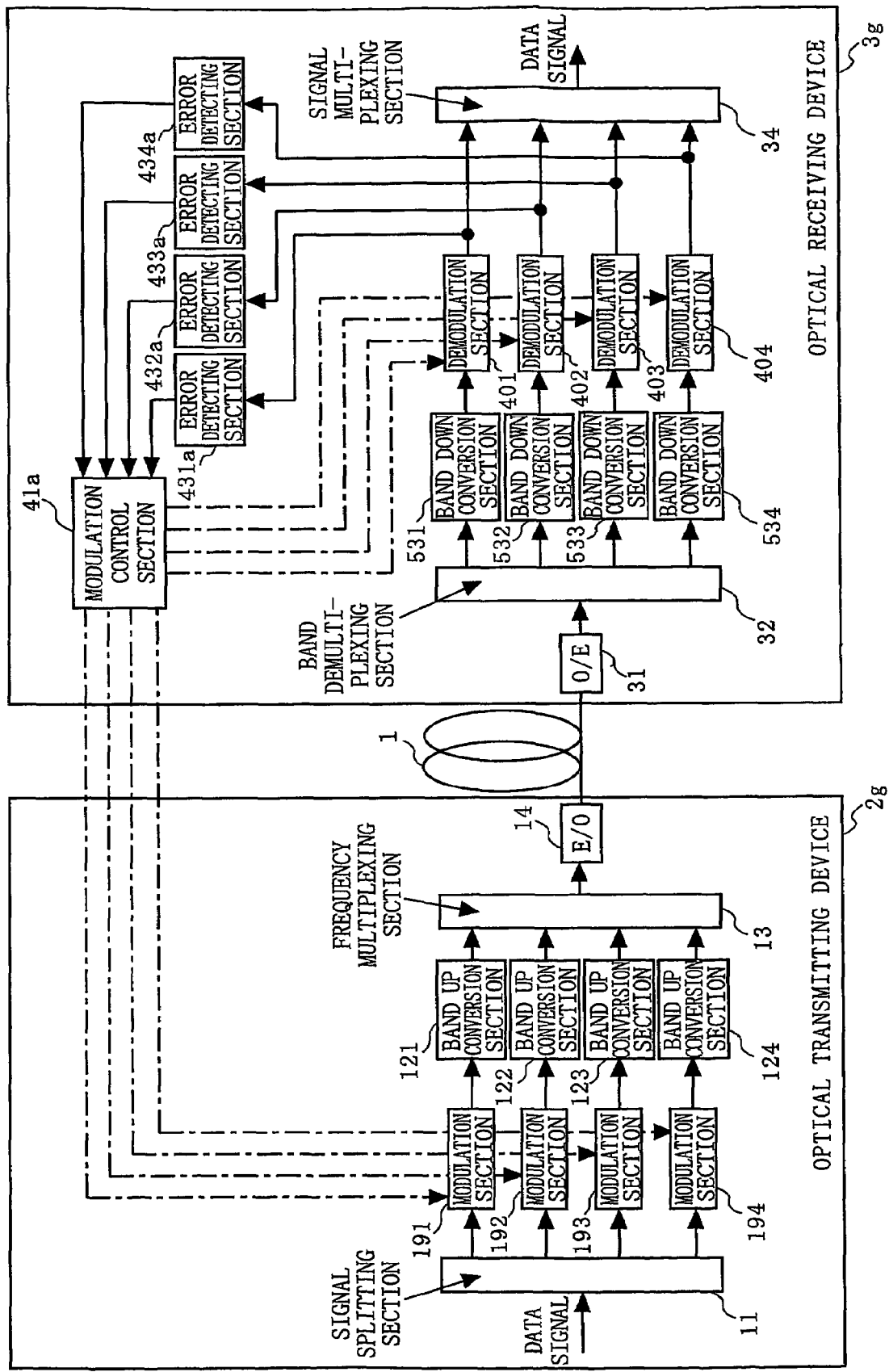
FIG. 18 is a block diagram showing a configuration of a split-band optical transmission system according to an eighth embodiment of the present embodiment.
Figure 19A:
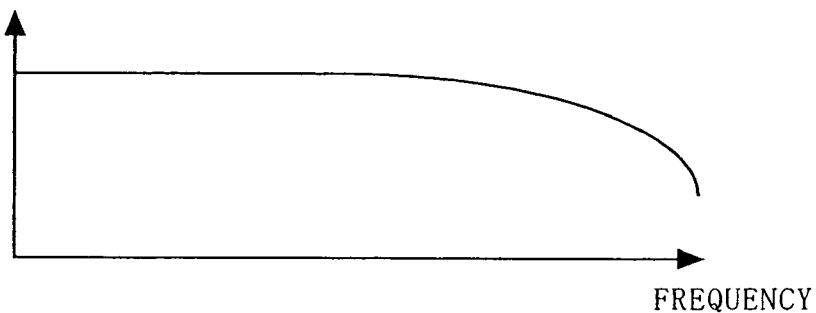
FIG. 19A is an illustration showing a frequency response of a conventional optical transmitter.
Figure 19B:
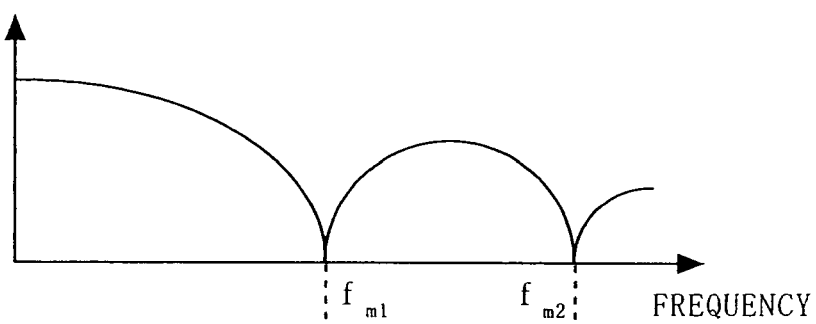
FIG. 19B is an illustration showing a frequency response of a conventional optical transmission path composed of an optical transmitter, an optical receiver, and an optical fiber.
Figure 19C:
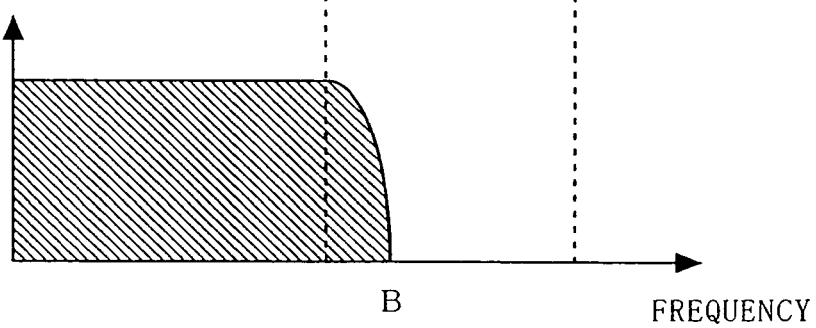
FIG. 19C is an illustration showing a signal band used in conventional baseband transmission.
Figure 20:
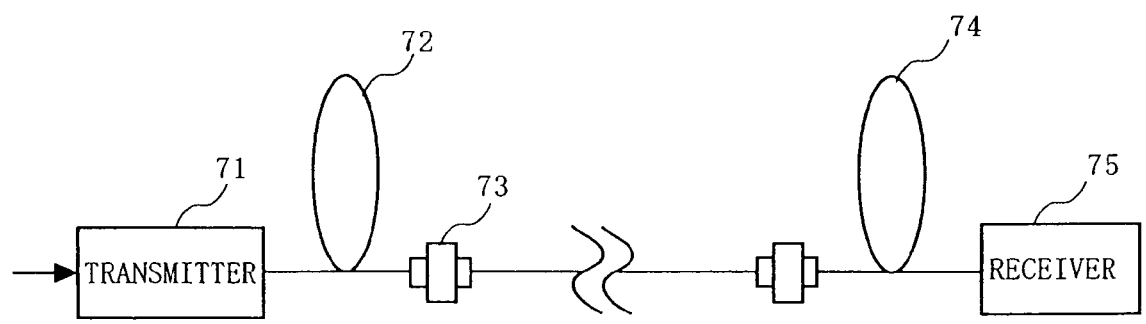
FIG. 20 is an illustration showing one example of an optical communication device utilizing a conventional chromatic dispersion compensation method disclosed in Japanese Patent Gazette No. 2760233.

FIG. 18 is a block diagram showing a configuration of a split-band optical transmission system according to an eighth embodiment of the present invention. In FIG. 18, the split-band optical transmission system includes the signal splitting section 11, the modulation sections 191 to 194, the band up conversion sections 121 to 124, the frequency multiplexing section 13, the electrical-to-optical conversion section 14, the optical fiber 1, the optical-to-electrical conversion section 31, the band demultiplexing section 32, the band down conversion sections 531 to 534, the demodulation sections 401 to 404, the signal multiplexing section 34, error detecting sections 431a to 434a, and a modulation control section 41a. An optical transmitting device 2g is composed of the signal splitting section 11, the modulation sections 191 to 194, the band up conversion sections 121 to 124, the frequency multiplexing section 13, and the electrical-to-optical conversion section 14. An optical receiving device 3g is composed of the optical-to-electrical conversion section 31, the band demultiplexing section 32, the band down conversion sections 531 to 534, the demodulation sections 401 to 404, the signal multiplexing section 34, the error detecting sections 431a to 434a, and the modulation control section 41a. In FIG. 18, the components that function in a similar manner to their counterparts in the seventh embodiment are denoted by like numerals, with the descriptions thereof omitted.

The error detecting sections 431a to 434a are provided for first to fourth baseband signals, respectively, and the first to fourth baseband signals are output from the respective modulation sections 401 to 404. The error detecting sections 431a to 434a detect an error rate of the respective baseband signals.

The modulation control section 41a determines a modulation scheme of each modulation signal based on the error rate detected by any of the error detecting sections 431 to 434, and controls the modulation sections 191 to 194 and the demodulation sections 401 to 404 based thereon.

A signal format used in this embodiment is basically identical to the signal format used in the seventh embodiment. However, the present embodiment differs from the seventh embodiment in that a modulation scheme used for each modulation signal is determined by detecting an error rate of each baseband signal. That is, the modulation control section 41*a* controls so as to assign a modulation scheme requiring a high SNR to a modulation section corresponding to a band whose error rate is smaller than a predetermined value, and to assign a modulation scheme suitable for use at a low SNR to a modulation section corresponding to a band whose error rate is greater than a predetermined value. Further, the modulation control section 41*a* controls the modulation section, whose error rate is greater than a predetermined value even if a modulation scheme whose necessary SNR is the lowest is used, so as not to perform modulation.

Note that, in the present embodiment, a case in which a band of a data signal is split into four has been described. However, the number of split of the data signal is not limited to four, and the number thereof may be arbitrary as long as it is equal to or greater than two.

As such, based on the present embodiment, as is the case with the seventh embodiment, even if there is a frequency at which a frequency response is severely distorted due to chromatic dispersion, etc., in a band corresponding to a transmission rate, it is possible to perform high-quality transmission of a data signal by changing a modulation scheme in accordance with a frequency response in each split band. Thus, it is possible to provide an optical transmission system capable of extending a transmission range without using a chromatic dispersion compensation optical device.

INDUSTRIAL APPLICABILITY

The split-band optical transmission system according to the present invention, and the optical transmitting device, the optical receiving device, and the optical transmission method used therein, which are capable of performing high-speed, long-range, and high-quality transmission of an optical signal, are effective in the field of optical communication, etc.

The invention claimed is:

1. An optical transmission system comprising:
an optical transmitting device for converting an inputted data signal to an optical signal and for transmitting the optical signal to an optical transmission path; and
an optical receiving device for receiving the optical signal transmitted via the optical transmission path and for converting the received optical signal to the data signal, wherein:
the optical transmitting device includes:
a data signal splitting section for splitting information included in the data signal into at least two pieces of information, and for generating at least two respective electrical signals having different center frequencies and bands;
a frequency multiplexing section for performing frequency multiplexing of the at least two electrical signals generated by the data signal splitting section so as to generate a frequency-multiplexed signal; and
an electrical-to-optical conversion section for converting the frequency-multiplexed signal generated by the frequency multiplexing section to an optical signal and for transmitting the optical signal to the optical transmission path;
the optical receiving device includes:
an optical-to-electrical conversion section for converting the optical signal transmitted via the optical transmission path to the frequency-multiplexed signal;
a band demultiplexing section for demultiplexing the frequency-multiplexed signal output from the optical-to-electrical conversion section to obtain the at least two electrical signals; and
a data signal recovering section for recovering the data signal based on the at least two electrical signals demultiplexed by the band demultiplexing section;
each of the electrical signals generated by the data signal splitting section are located in different frequency bands which are away from a local minimum of a frequency response of the optical transmission path; and
the data signal splitting section includes:
a signal splitting section for splitting the information included in the data signal into the at least two pieces of information in accordance with a predetermined split ratio corresponding to the frequency response of the optical transmission path, and outputting the at least two pieces of information as at least two baseband signals, the at least two baseband signals including at least a first and a second baseband signal; and
at least one band up conversion section for converting a signal, which contains at least the second baseband signal and excludes the first baseband signal of the at least two baseband signals output from the signal splitting section, to a passband signal having a predetermined frequency as a center frequency, wherein the first baseband signal and the passband signal are output from the data signal splitting section as the generated at least two electrical signals.

2. The optical transmission system according to claim 1, wherein
the frequency multiplexing section performs frequency multiplexing of the first baseband signal and the passband signal,
the band demultiplexing section demultiplexes the frequency-multiplexed signal to obtain the first baseband signal and the passband signal,
the data signal recovering section includes:
a band down conversion section for converting the passband signal demultiplexed by the band demultiplexing section to the second baseband signal by frequency conversion; and
a signal multiplexing section for recovering the data signal by multiplexing the first baseband signal demultiplexed by the band demultiplexing section and the second baseband signal converted by the band down conversion section, and
the predetermined split ratio and the predetermined frequency are variably settable.

3. The optical transmission system according to claim 2, wherein the band demultiplexing section includes a low-pass filter for demultiplexing the second baseband signal, and a high-pass filter for demultiplexing the passband signal.

4. The optical transmission system according to claim 2, wherein the band down conversion section includes:

a sine wave oscillator for outputting a sine wave signal with the predetermined frequency;

a mixer for converting the passband signal to a baseband signal by frequency conversion by mixing the passband signal with the sine wave signal; and a low-pass filter for extracting only the second baseband signal from a signal output from the mixer.

5. The optical transmission system according to claim 2, wherein the optical receiving device further includes:

a first error detecting section for detecting an error rate of the first baseband signal demultiplexed by the band demultiplexing section;

a second error detecting section for detecting an error rate of the second baseband signal obtained by the band down conversion section; and a band control section for controlling the predetermined split ratio and the predetermined frequency so that the error rates of the first and second baseband signals are smaller than a predetermined value.

6. The optical transmission system according to claim 2, wherein the optical transmitting device further includes:

a monitor signal source for outputting a monitor signal, which is a sine wave signal, while sweeping a frequency thereof; and a switch for inputting, to the electrical-to-optical conversion section, either a frequency-multiplexed signal output from the frequency multiplexing section or a monitor signal output from the monitor signal source, and the optical receiving device further includes:

a frequency response detecting section for extracting the monitor signal from a signal output from the optical-to-electrical conversion section, and detecting the frequency response of the optical transmission path based on a level of the monitor signal having the sweeping frequency; and a band control section for controlling the predetermined split ratio and the predetermined frequency based on the frequency response of the optical transmission path detected by the frequency response detecting section.

7. The optical transmission system according to claim 2, comprising:

a first multilevel modulation section for performing multilevel modulation of the first baseband signal output from the signal splitting section in accordance with a predetermined first M-ary number determined based on the frequency response of the optical transmission path, and for outputting a first multilevel modulation signal;

a second multilevel modulation section for performing multilevel modulation of the second baseband signal output from the signal splitting section in accordance with a predetermined second M-ary number determined based on the frequency response of the optical transmission path, and for outputting a second multilevel modulation signal;

a first multilevel demodulation section for demodulating the first multilevel modulation signal which is demultiplexed by the band demultiplexing section, and for outputting the first baseband signal; and a second multilevel demodulation section for converting the second multilevel modulation signal which is output from the band down conversion section to the second baseband signal by demodulation.

8. The optical transmission system according to claim 7, wherein the predetermined first and second M-ary numbers are determined based on data rates necessary for the first and based on second baseband signals and a ratio of frequency bands assigned to the first and second baseband signals.

9. The optical transmission system according to claim 7, wherein the optical receiving device further includes:

a first error detecting section for detecting an error rate of the first baseband signal output from the first multilevel demodulation section;

a second error rate detecting section for detecting an error rate of the second baseband signal output from the second multilevel demodulation section; and a band M-ary number control section for controlling the predetermined split, ratio, the predetermined frequency, the predetermined first M-ary number, and the predetermined second M-ary number so that the error rates of the first and second baseband signals are smaller than a predetermined value.

10. The optical transmission system according to claim 7, wherein the passband signal is a signal for which single side-band modulation is performed.

11. The optical transmission system according to claim 2, wherein the passband signal is a signal on which single side-band modulation is performed.

12. The optical transmission system according to claim 2, comprising:

a first duo-binary modulation section for performing duo-binary modulation of the first baseband signal output from the signal splitting section, and for outputting a first duo-binary signal;

a second duo-binary modulation section for performing duo-binary modulation of the second baseband signal output from the signal splitting section, and for outputting a second duo-binary signal;

a first duo-binary demodulation section for demodulating the first duo-binary signal which is demultiplexed by the band demultiplexing section, and for outputting the first baseband signal; and a second duo-binary demodulation section for converting the second duo-binary signal which is output from the band down conversion section to the second baseband signal by demodulation.

13. The optical transmission system according to claim 1, wherein the frequency response of the optical transmission path includes a first frequency and a second frequency as local minimums, the predetermined split ratio is determined based on a ratio between a bandwidth of a baseband up to the first frequency and a bandwidth of a passband from the first frequency to the second frequency, and the predetermined frequency lies within the passband.

14. The optical transmission system according to claim 1, wherein the band up conversion section includes:

a sine wave oscillator for generating a sine wave signal with the predetermined frequency;

a mixer for performing frequency conversions of the second baseband signal, by mixing the second baseband signal and the sine wave signal output from the sine wave oscillator, to obtain the passband signal having the center frequency equal to the predetermined frequency of the sine wave signal; and a band-pass filter for extracting only the passband signal from a signal output from the mixer.

15. The optical transmission system according to claim 1, wherein the signal splitting section is for splitting information included in the data signal into N, wherein N is equal to or greater than three, pieces of information in accordance with the predetermined split ratio, and for outputting the resultant N pieces of information as first to $N_{th}$ baseband signals, the data signal splitting section further includes first to $N-1_{th}$ band up conversion sections for converting the second to $N_{th}$ baseband signals respectively, which are output from the signal splitting section to first to $N-1_{th}$ passband signals, the first the $N-1_{th}$ passband signals having different predetermined frequencies as center frequencies, the data signal splitting section outputs the first baseband signal and the first to $N-1_{th}$ passband signals as the generated at least two electrical signals, the frequency multiplexing section performs frequency multiplexing of the first baseband signal and the first to $N-1_{th}$ passband signals, the band demultiplexing section demultiplexes the frequency-multiplexed signal to obtain the first baseband signal and the first to $N-1_{th}$ passband signals, and the data signal recovering section includes:
  first to $N-1_{th}$ band down conversion sections for converting the first to $N-1_{th}$ passband signals, respectively, which are demultiplexed by the band demultiplexing section to the second to $N_{th}$ baseband signals by frequency conversion; and
  a signal multiplexing section for recovering the data signal by multiplexing the first baseband signal demultiplexed by the band demultiplexing section and the second to $N_{th}$ baseband signals converted by the band down conversion sections respectively.

16. The optical transmission system according to claim 15, comprising:
  first to $N_{th}$ multilevel modulation sections for performing multilevel modulation of the first to $N_{th}$ baseband signals, respectively, which are output from the signal splitting section in accordance with predetermined M-ary numbers determined based on the frequency response of the optical transmission path, and for outputting first to $N_{th}$ multilevel modulation signals; and
  first to $N_{th}$ multilevel demodulation sections for converting the first to $N_{th}$ multilevel modulation signals, respectively, which are output from the band demultiplexing section and the band down conversion sections to the first to $N_{th}$ baseband signals.

17. The optical transmission system according to claim 15, comprising:
  first to $N_{th}$ duo-binary modulation sections for performing duo-binary modulation off the respective first to $N_{th}$ baseband signals, respectively, which are output from the signal splitting section, and for outputting first to $N_{th}$ duo-binary signals; and
  first to $N_{th}$ duo-binary demodulation sections for converting the first to $N_{th}$ duo-binary signals, respectively, which are output from the band demultiplexing section and the band down conversion sections to the first to $N_{th}$ baseband signals by demodulation.

18. The optical transmission system according to claim 1, wherein
  the signal splitting section is for splitting information included in the data signal into N, wherein N is equal to or greater than two, pieces of information in accordance with the predetermined split ratio, and for outputting the resultant N pieces of information as first to $N_{th}$ baseband signals, the data signal splitting section further includes:
  first to $N_{th}$ modulation sections for performing modulation of the first to $N_{th}$ baseband signals, respectively, which are output from the signal splitting section, according to a predetermined scheme, and for outputting resultant first to $N_{th}$ modulation signals; and
  first to $N_{th}$ band up conversion sections for converting the first to $N_{th}$ modulation signals, respectively, which are output from the first to $N_{th}$ modulation sections to first to $N_{th}$ electrical signals, the first to $N_{th}$ electrical signals having different predetermined frequencies as center frequencies, and for outputting the first to $N_{th}$ electrical signals, the frequency multiplexing section performs frequency multiplexing of the first to $N_{th}$ electrical signals, the band demultiplexing section demultiplexes the frequency-multiplexed signal to obtain the first to $N_{th}$ electrical signals, the data signal recovering section includes:
  first to $N_{th}$ band down conversion sections for converting the first to $N_{th}$ electrical signals, respectively, which are demultiplexed by the band demultiplexing section to the first to the $N_{th}$ modulation signals by frequency conversion;
  first to $N_{th}$ demodulation sections for demodulating the first to $N_{th}$ modulation signals, respectively, which are output from the first to $N_{th}$ band up conversion sections, and for outputting the first to $N_{th}$ baseband signals; and
  a signal multiplexing section for recovering the data signal by multiplexing the first to $N_{th}$ baseband signals which are output from the first to $N_{th}$ demodulation sections, and the optical receiving device further includes:
  first to $N_{th}$ level detecting sections for detecting levels of the first to $N_{th}$ modulation signals which are output from the first to $N_{th}$ band down conversion sections, respectively; and
  a modulation control section for controlling a modulation scheme used in each of the first to $N_{th}$ modulation sections based on the levels of the first to $N_{th}$ modulation signals detected by the respective first to $N_{th}$ level detecting sections, respectively.

19. The optical transmission system according to claim 18, wherein the modulation control section causes any modulation section of the first to $N_{th}$ modulation sections corresponding to any of the first to $N_{th}$ modulation signals to stop transmitting a respective first to $N_{th}$ modulation signal if a signal level thereof, which is detected by any of the first to $N_{th}$ level detecting sections, is equal to or smaller than a predetermined value.

20. The optical transmission system according to claim 1, wherein
  the signal splitting section is for splitting information included in the data signal into N, wherein N is equal to or greater than two, pieces of information in accordance with the predetermined split ratio, and for outputting the resultant N pieces of information as first to $N_{th}$ baseband signals, the data signal splitting section includes:
    first to $N_{th}$ modulation sections for performing modulation of the first to $N_{th}$ baseband signals, respectively, which are output from the signal splitting section, according to a predetermined scheme, and for outputting resultant first to $N_{th}$ modulation signals; and first to $N_{th}$ band up conversion sections for converting the first to $N_{th}$ modulation signals, respectively, which are output from the first to $N_{th}$ modulation sections to first to $N_{th}$ electrical signals, the first to $N_{th}$ electrical signals having different predetermined frequencies as center frequencies, and for outputting the first to $N_{th}$ electrical signals, the frequency multiplexing section performs frequency multiplexing of the first to $N_{th}$ electrical signals, the band demultiplexing section demultiplexes the frequency-multiplexed signal to obtain the first to $N_{th}$ electrical signals, the data signal recovering section includes:
first to $N_{th}$ band down conversion sections for converting the first to $N_{th}$ electrical signals, respectively, which are demultiplexed by the band demultiplexing section to the first to the $N_{th}$ modulation signals by frequency conversion;

first to $N_{th}$ demodulation sections for demodulating the first to $N_{th}$ modulation signals, respectively, which are output from the first to $N_{th}$ band up conversion sections, and for outputting the first to $N_{th}$ baseband signals; and a signal multiplexing section for recovering the data signal by multiplexing the first to $N_{th}$ baseband signals which are output from the first to $N_{th}$ demodulation sections, respectively, and the optical receiving device further includes:
first to $N_{th}$ error detecting sections for detecting error rates of the first to $N_{th}$ baseband signals which are output from the first to $N_{th}$ demodulation sections, respectively; and a modulation control section for controlling a modulation scheme used in each of the first to $N_{th}$ modulation sections based on the error rates of the first to $N_{th}$ baseband signals detected by the first to $N_{th}$ error detecting sections, respectively.

21. The optical transmission system according to claim 20, wherein the modulation control section causes any modulation section of the first to $N_{th}$ modulation sections corresponding to any of the first to $N_{th}$ baseband signals to stop outputting a respective first to $N_{th}$ modulation signal if an error rate thereof, which is detected by any of the first to $N_{th}$ error detecting section, is equal to or smaller than a predetermined value.

22. An optical transmitting device for converting an inputted data signal to an optical signal and transmitting the optical signal to an optical transmission path, the optical transmitting device comprising:
a data signal splitting section for splitting information included in the data signal into at least two pieces of information, and for generating at least two respective electrical signals having different center frequencies and bands;

a frequency multiplexing section for performing frequency multiplexing of the at least two electrical signals generated by the data signal splitting section so as to generate a frequency-multiplexed signal; and an electrical-to-optical conversion section for converting the frequency-multiplexed signal generated by the frequency multiplexing section to an optical signal, and for transmitting the optical signal to the optical transmission path, wherein:
located in different frequency bands which are away from a local minimum of a frequency response of the optical transmission path; and the data signal splitting section includes:
a signal splitting section for splitting the information included in the data signal into the at least two pieces of information in accordance with a predetermined split ratio corresponding to the frequency response of the optical transmission path and outputting the at least two pieces of information as at least two baseband signals, the at least two baseband signals including at least a first and a second baseband signal; and at least one band up conversion section for converting a signal, which contains at least the second baseband signal and excludes the first baseband signal of the at least two baseband signals output from the signal splitting section, to a passband signal having a predetermined frequency as a center frequency, wherein the first baseband signal and the passband signal are output from the data signal splitting section as the generated at least two electrical signals.

23. An optical receiving device for receiving, from an optical transmitting device converting an inputted data signal into an optical signal, the optical signal transmitted via an optical transmission path, and for converting the received optical signal to the data signal, the optical transmitting device converts a frequency-multiplexed signal of at least two electrical signals, which are generated so as to be located in different frequency bands which are away from a local minimum of a frequency response of the optical transmission path, to the optical signal by electrical-to-optical conversion, the optical receiving device comprising:
an optical-to-electrical conversion section for converting the optical signal transmitted via the optical transmission path to the frequency-multiplexed signal;

a band demultiplexing section for demultiplexing the frequency-multiplexed signal output from the optical-to-electrical conversion section to obtain the at least two electrical signals; and a data signal recovering section for recovering the data signal based on the at least two electrical signals demultiplexed by the band demultiplexing section, wherein:
the band demultiplexing section is operable to variably set a frequency band of each electrical signal demultiplexed from the frequency-multiplexed signal, and the at least two electrical signals demultiplexed by the band demultiplexing section contain a first baseband signal and a passband signal having different predetermined frequencies center frequencies; and the data signal recovering section includes:
a band down conversion section for converting the passband signal demultiplexed by the band demultiplexing section to a second baseband signal by frequency conversion; and a signal multiplexing section for recovering the data signal by multiplexing the first baseband signal demultiplexed by the band demultiplexing section and the second baseband signal converted by the band down conversion section.

24. An optical transmission method for transmitting an optical signal, which is converted from an inputted data signal, to an optical transmission path, and for receiving the optical signal transmitted via the optical transmission path and converting the optical signal to the data signal, the optical transmission method including:

splitting information included in the data signal into two pieces of information, and generating at least two respective electrical signals having different center frequencies and bands, each of the at least two electrical signals are located in different frequency bands which are away from a local minimum of a frequency response of the optical transmission path, the generated at least two electrical signals containing a first baseband signal and a second baseband signal which are generated by splitting information, included in the data signal, in accordance with a predetermined split ratio corresponding to the frequency response of the optical transmission path, and converting the second baseband signal to a passband signal having a predetermined frequency as a center frequency;

performing frequency multiplexing of the generated at least two electrical signals and generating a frequency-multiplexed signal;

converting the frequency-multiplexed signal to an optical signal, and transmitting the optical signal to the optical transmission path;

converting the optical signal transmitted via the optical transmission path to the frequency-multiplexed signal;

demultiplexing the frequency-multiplexed signal to obtain the at least two electrical signals; and recovering the data signal based on the demultiplexed at least two electrical signals.

* * * * *